US012644226B2

(12) United States Patent
Nito et al.

(10) Patent No.: US 12,644,226 B2
(45) Date of Patent: Jun. 2, 2026

(54) IMAGE FORMING METHOD, IMAGE FORMING APPARATUS, AND IMAGE FORMING SYSTEM

(71) Applicant: Konica Minolta, Inc., Tokyo (JP)

(72) Inventors: Ken Nito, Hino (JP); Ayumi Kawamura, Hino (JP)

(73) Assignee: KONICA MINOLTA, INC., Tokyo (JP)

(*) Notice: Subject to any disclaimer, the term of this patent is extended or adjusted under 35 U.S.C. 154(b) by 271 days.

(21) Appl. No.: 18/330,470

(22) Filed: Jun. 7, 2023

(65) Prior Publication Data

US 2023/0398801 A1 Dec. 14, 2023

(30) Foreign Application Priority Data

Jun. 9, 2022 (JP) ................................ 2022-093406
Jun. 9, 2022 (JP) ................................ 2022-093407

(51) Int. Cl.
*D06P 5/28* (2006.01)
*B41F 16/02* (2006.01)
*D06P 5/00* (2006.01)
*D06P 1/651* (2006.01)

(52) U.S. Cl.
CPC .............. *D06P 5/004* (2013.01); *B41F 16/02* (2013.01); *D06P 5/002* (2013.01); *D06P 1/65168* (2013.01)

(58) Field of Classification Search
CPC ...... B41F 16/02; D06P 1/65168; D06P 5/002; D06P 5/004; D06P 5/005; D06P 5/006; D06P 5/22; D06P 5/225
See application file for complete search history.

(56) References Cited

U.S. PATENT DOCUMENTS 4,072,462 A * 2/1978 Vellins .................... D06P 5/005 106/31.47
4,113,431 A * 9/1978 Terada ...................... D06P 5/22 8/129
2008/0006176 A1 1/2008 Houjou
(Continued)

FOREIGN PATENT DOCUMENTS

CN 110626068 A 12/2019
CN 115613376 A 1/2023
(Continued)

OTHER PUBLICATIONS

Office Action, dated Aug. 6, 2025, which was issued for the corresponding Chinese Patent Application No. 202310676123.6, 19 pages, with English translation.
(Continued)

*Primary Examiner* — Gerard Higgins
(74) *Attorney, Agent, or Firm* — LUCAS & MERCANTI, LLP

(57) ABSTRACT

An image forming method for forming an image on a cloth with a sublimation coloring material, the image forming method including: pretreatment liquid applying that is applying a pretreatment liquid to the cloth; drying that is drying the cloth after the pretreatment liquid applying; and sublimation coloring material applying that is applying the sublimation coloring material to the cloth after the drying. The pretreatment liquid contains an organic compound, and a heat source and the cloth are not in contact with each other in the drying.

15 Claims, 5 Drawing Sheets

(56) References Cited

U.S. PATENT DOCUMENTS

| | | | | |
|---|---|---|---|---|
| 2011/0169901 | A1 * | 7/2011 | Pinto | D06P 5/30 347/101 |
| 2013/0022795 | A1 | 1/2013 | Wang et al. | |

FOREIGN PATENT DOCUMENTS

| | | | | |
|---|---|---|---|---|
| JP | S51-99185 | A | | 9/1976 |
| JP | S54024510 | B | * | 8/1979 |
| JP | H07-216763 | A | | 8/1995 |
| JP | 2005-232633 | A | | 9/2005 |
| JP | 2010-065176 | A | | 3/2010 |
| JP | 3188954 | U | * | 2/2014 |
| JP | 2021-042514 | A | | 3/2021 |
| JP | 2021-080373 | A | | 5/2021 |

OTHER PUBLICATIONS

Office Action, dated Jan. 6, 2026, which was issued for the corresponding Japanese Patent Application No. 2022-093406, 11 pages, with English translation.

Office Action, dated Jan. 13, 2026, which was issued for the corresponding Japanese Patent Application No. 2022-093407, 7 pages, with English translation.

* cited by examiner

IMAGE FORMING METHOD, IMAGE FORMING APPARATUS, AND IMAGE FORMING SYSTEM

REFERENCE TO RELATED APPLICATIONS

The entire disclosure of Japanese Patent Applications No. 2022-093406, filed on Jun. 9, 2022, and No. 2022-093407, filed on Jun. 9, 2022, including description, claims, drawings, and abstract is incorporated herein by reference in its entirety.

TECHNICAL FIELD

The present invention relates to an image forming method, an image forming apparatus, and an image forming system. More specifically, the present invention relates to an image forming method, an image forming apparatus, and an image forming system in which a dyeing density is improved, and dyeing unevenness is reduced.

DESCRIPTION OF THE RELATED ART

As a method for forming an image on cloth, a technology of using a sublimation coloring material (sublimate dye) is known. Since the dyeing property (dyeing density and color fastness) of the resulting product is good and the load on the environment can be reduced, it has been widely used in recent years.

The sublimation coloring material is a dispersed dye and is not soluble in water but is dispersed in water by being mixed with a dispersant. The disperse dye performs dyeing in such a manner that dye molecules diffuse into the inside of the fiber from voids of amorphous portions of the fiber and the dye molecules and fiber molecules are bonded to each other by an intermolecular force or a hydrogen bond.

For example, polyester has a small gap of an amorphous portion at room temperature, and a dye molecule hardly enters. Therefore, when the polyester is heated to a temperature equal to or higher than the glass transition temperature, the micro—Brownian motion is activated and gaps between polymer chains are opened, with the result that dye molecules tend to enter the gaps. Thereafter, the gaps between the polymer chains are closed at room temperature, and the dye molecules are confined inside the fibers to perform dyeing.

Therefore, usually, cloths to be used are limited to chemical fibers, including polyester, which can be dyed with a sublimation coloring material. However, since dyeing with a sublimation coloring material can reduce a load on the environment, application to natural fibers, cellulose regenerated fibers and the like for which dyeing with a sublimation coloring material is usually difficult is expected.

However, since natural fibers and cellulose regenerated fibers have no gap into which a dye molecule enters, it is necessary to form a gap into which a dye molecule enters in advance and apply a sublimation coloring material.

As a method of forming gaps into which dye molecules enter, a method of swelling fibers by using a pretreatment liquid containing a swelling agent is known. Furthermore, in order to improve the dyeing density and reduce uneven dyeing, it is preferable to evenly apply an appropriate amount of the pretreatment liquid to the cloth.

Known methods for uniformly applying an appropriate amount of a pretreatment liquid include a method in which a cloth is immersed in a pretreatment liquid and a method in which a pretreatment liquid is applied to a cloth by an inkjet method. In addition, by drying the cloth after the pretreatment liquid is applied, it is possible to suppress the pretreatment liquid from being carried in a process performed thereafter, for example, applying a sublimation coloring material. That is, it is known that productivity can be improved. However, as a result of repeated studies by the inventors, it was found that it is difficult to eliminate the concentration unevenness of the pretreatment liquid with high accuracy depending on the drying method, and dyeing unevenness occurs. In addition, in the conventional art, an optimal drying method from the viewpoint of improving the dyeing density and reducing the dyeing unevenness has not been sufficiently studied.

In Japanese Unexamined Patent Publication No. H 07-216763, a cloth base material non-dyeable to a sublimate dye is swollen with a swelling agent and then dyed by a sublimation transfer method. Subsequently, a synthetic resin disclosed in which a synthetic resin liquid is applied and heated and dried to encapsulate and fix the dye particles inside the cloth base material.

Here, in Examples supporting the above-described technique, a cotton cloth (cloth substrate) is immersed in a 30% aqueous solution of polypropylene glycol (swelling agent), and the cotton cloth is squeezed at a squeezing ratio of 100%. Thereafter, drying is performed at 100° C. for 5 minutes, but details of a drying method are not described.

Japanese Unexamined Patent Publication No. 2021-042514 discloses a technique relating to a transfer printing method including a pre-treatment step of applying a swelling agent and a water-repellent agent to a textile product containing vegetable fibers.

Here, in the pretreatment step, it is preferable to dry the swelling agent and the water repellent to remove moisture and the like, and the drying temperature and time are described in detail. However, details of a drying method are not described therein.

SUMMARY OF THE INVENTION

The present invention has been made in view of the above problems and circumstances, and an object of the present invention is to provide an image forming method, an image forming apparatus, and an image forming system in which dyeing density is improved and dyeing unevenness is reduced.

The present inventors have conducted studies to solve the above-described problems, and as a result, they have found that an image forming method for forming an image on a cloth with a sublimation coloring material includes applying a pretreatment liquid to the cloth, drying the cloth, and applying the sublimation coloring material to the cloth in this order, in which the pretreatment liquid contains an organic compound, and in the drying, a heat source and the cloth are not in contact with each other, whereby a dyeing density is improved and dyeing unevenness is reduced, thereby completing the present invention.

To achieve at least one of the abovementioned objects, according to an aspect of the present invention, an image forming method reflecting one aspect of the present invention is an image forming method for forming an image on a cloth with a sublimation coloring material, the image forming method comprising: pretreatment liquid applying that is applying a pretreatment liquid to the cloth; drying that is drying the cloth after the pretreatment liquid applying; and sublimation coloring material applying that is applying the sublimation coloring material to the cloth after the drying, wherein the pretreatment liquid contains an organic compound, and a heat source and the cloth are not in contact with each other in the drying.

To achieve at least one of the abovementioned objects, according to an aspect of the present invention, an image forming apparatus reflecting one aspect of the present invention is an image forming apparatus that forms an image on a cloth with a sublimation coloring material, the image forming apparatus comprising: a pretreatment liquid applying unit that applies a pretreatment liquid to the cloth; a drying unit that dries the cloth; and a sublimation coloring material applying unit that applies the sublimation coloring material to the cloth, wherein in the drying unit, a heat source and the cloth are not in contact with each other.

To achieve at least one of the abovementioned objects, according to another aspect of the present invention, image forming system reflecting one aspect of the present invention is an image forming system that dyes a cloth containing natural fibers by a sublimation transfer method, the image forming system comprising: a pretreatment liquid applying unit that applies a pretreatment liquid to the cloth; a drying unit that dries the cloth; a sublimation ink applying unit that applies a sublimation ink to a transfer medium; and a transfer unit that transfers the sublimation ink from the transfer medium to the cloth, wherein in the drying unit, a heat source and the cloth are not in contact with each other, the pretreatment liquid contains, as a solvent, an organic solvent containing nitrogen or sulfur, and an application amount of the organic solvent immediately after the pretreatment liquid is applied is within a range of 10 to 150 mass % with respect to a mass of the entire cloth, and a residual amount of the organic solvent immediately before transfer of the sublimation ink to the cloth in the transfer unit is in a range of 3 to 40 mass % with respect to a mass of the entire cloth.

An expression mechanism or an action mechanism of the effects of the present invention is not clear, but is assumed as follows.

By using the pretreatment liquid containing an organic solvent having a swelling function or a dissolving function, an image can also be formed on a natural fiber, a regenerated cellulose fiber, or the like on which an image is hardly formed by a sublimation coloring material.

In addition, an image is formed by a sublimation coloring material using a pretreatment liquid containing an organic solvent having a swelling function or a dissolving function. In this case, in order to improve the dyeing density and reduce uneven dyeing, it is preferable that an appropriate amount of the pretreatment liquid be applied uniformly to the cloth after the application and drying of the pretreatment liquid.

However, as a result of extensive studies, the present inventors have found that concentration unevenness of the pretreatment liquid occurs depending on a method for drying a cloth, which causes a decrease in dyeing concentration and dyeing unevenness.

Methods for drying cloth are broadly classified into a contact type in which a heat source and cloth are brought into contact with each other for drying and a non-contact type in which a heat source and cloth are not brought into contact with each other for drying.

In the contact type, heat is easily transmitted to a portion of the cloth which is relatively close to the heat source, and thus drying easily progresses. On the other hand, heat is less likely to be transferred to a portion relatively far from the heat source, and drying is less likely to proceed. In addition, it is likely to be affected by temperature unevenness in the heat source.

For example, when the surface of the cloth is dried by being brought into contact with a hot plate, concentration unevenness of the pretreatment liquid is likely to occur in the thickness direction of the cloth. In addition, due to temperature unevenness in the hot plate itself, temperature unevenness also occurs in the cloth to be heated, and concentration unevenness of the pretreatment liquid is likely to occur.

On the other hand, in the non-contact type, the distance from the heat source is overwhelmingly far compared to the contact type, and it is possible to heat the entire cloth at a uniform temperature, and therefore, it is easy for drying to progress uniformly. Further, it is not easily affected by temperature unevenness in the heat source.

Further, by appropriately adjusting the conditions such as the drying temperature and time in a non-contact manner, the concentration unevenness of the pretreatment liquid can be eliminated with high accuracy. That is, it is considered that since the pretreatment liquid can be applied in an appropriate amount without unevenness, the dyeing density can be improved, and the dyeing unevenness can be reduced in the formation of an image.

In addition, the image forming method according to an aspect of the present invention is an image forming method in which dyeing is performed by a sublimation transfer method, in which a specific amount of a pretreatment liquid containing an organic solvent containing nitrogen or sulfur is applied to a cloth containing a natural fiber. Next, the cloth is swollen and then dried to reduce the content of the organic solvent in the pretreatment liquid, and then the sublimation dye is transferred to form an image.

In Japanese Unexamined Patent Publication No. H 07-216763 and Japanese Unexamined Patent Publication No. 2021-042514, a cloth is preliminarily impregnated with a swelling agent (a polyhydric alcohol) to swell the cloth, thereby widening a gap between fibers and making it easier for the sublimation dye to enter the inside of the fibers.

In contrast, in the image forming method according to an aspect of the present invention, the pretreatment liquid contains an organic solvent containing nitrogen or sulfur as a solvent for the sublimation dye. Since the organic solvent also functions as a swelling agent, the sublimation dye is more easily captured inside the fibers of the cloth and the dyeing density is higher than in a transferred image formed by a technique using a conventional swelling agent (polyhydric alcohol).

The cloth is swollen with a swelling agent to widen the gap between fibers, thereby making it easier for the sublimation dye to enter the inside of the fibers. Thereafter, the cloth is dried to reduce the content of the organic solvent in the pretreatment liquid, thereby controlling the amount of the swelling agent to a constant amount. Therefore, it is possible to prevent yellowing of a white portion of a transfer image due to an excessively large amount of the swelling agent and discoloration of the sublimation ink under a high-humidity environment.

That is, it is an image forming method in which the dyeing property to a cloth containing a natural fiber is high, and yellowing during heating and discoloration under a high-humidity environment can be suppressed.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Figure 1:
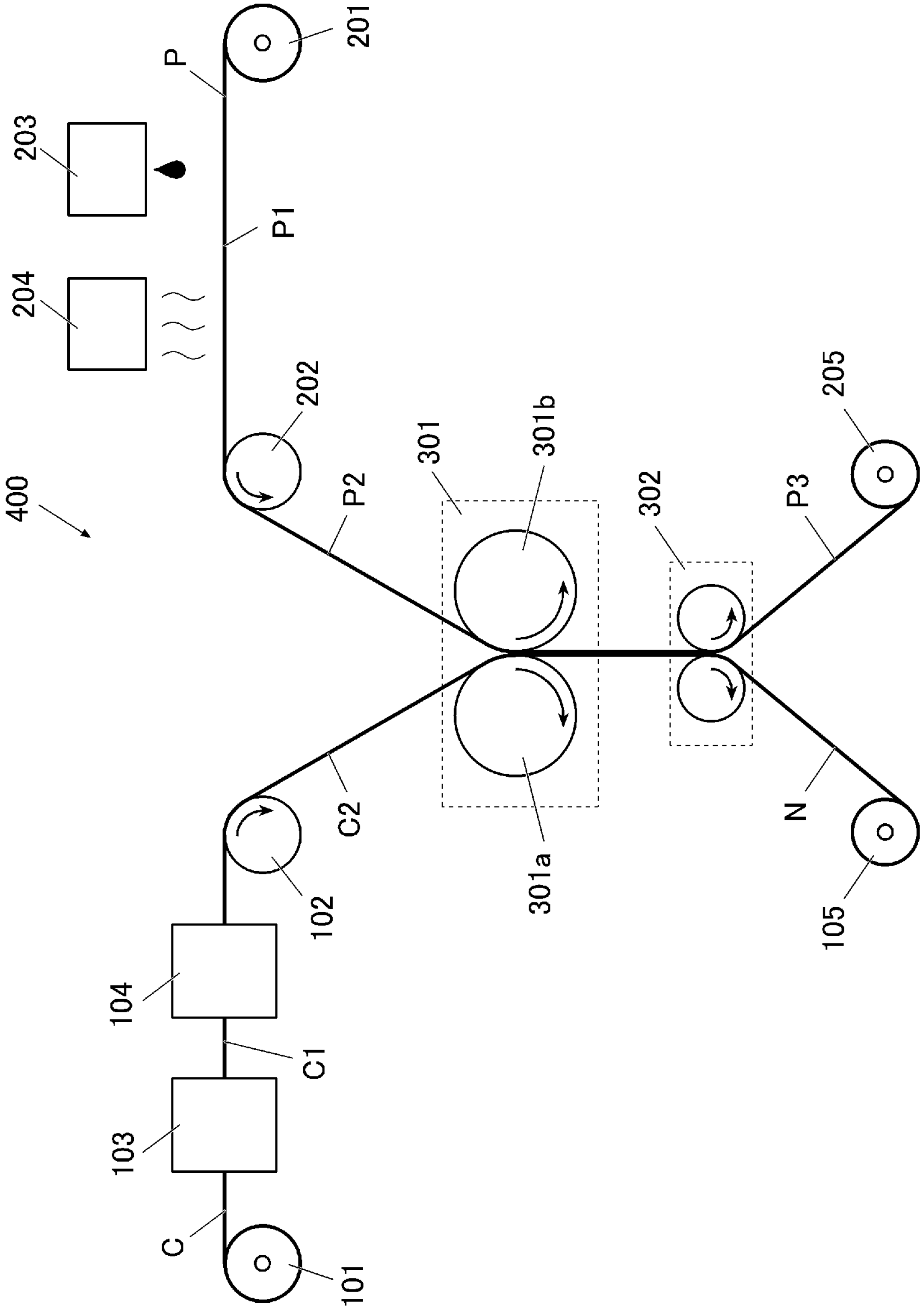
FIG. 1 is a schematic diagram of an image forming apparatus (sublimation transfer method, continuous type) of the present invention.

An image forming method according to an embodiment of the present invention is an image forming method for forming an image on a cloth with a sublimation coloring material, the image forming method including, in the following order: applying a pretreatment liquid to the cloth; drying the cloth; and applying the sublimation coloring material to the cloth, in which the pretreatment liquid contains an organic compound, and a heat source and the cloth are not in contact with each other in the drying.

This feature is a technical feature common to or corresponding to the following embodiments.

As an embodiment of the present invention, from the viewpoint that the effect of the present invention is remarkable, it is preferable that the step of applying the sublimation coloring material includes transferring a transfer image formed by applying an ink containing the sublimation coloring material onto a transfer medium to the cloth.

As an embodiment of the present invention, from the viewpoint of exhibiting the effect of the present invention, it is preferable that the cloth is dried by circulating warm air in the drying.

As an embodiment of the present invention, from the viewpoint of dyeing unevenness, it is preferable that, in the transferring, the transfer image formed on the transfer medium is transferred to the cloth by using a heating roller.

In an embodiment of the present invention, the cloth preferably contains a natural fiber from the viewpoint of exhibiting the effect of the present invention.

In an embodiment of the present invention, from the viewpoint of exhibiting the effects of the present invention, the cloth preferably contains cellulose.

In an embodiment of the present invention, from the viewpoints of dyeing density and dyeing unevenness, the content of the organic compound is preferably within a range of 35 to 100 mass %, and more preferably within a range of 50 to 100 mass %, with respect to the total mass of the pretreatment liquid.

In an embodiment of the present invention, from the viewpoint of dyeing density and dyeing unevenness, the organic compound preferably contains an organic compound having a value of a ratio of an inorganic value to an organic value (I/O value) in a range of 1.00 to 3.00, and the organic compound more preferably contains dimethyl sulfoxide.

In an embodiment of the present invention, from the viewpoint of dyeing density, it is preferable that the pretreatment liquid further contains a coloring material capturing compound.

According to an aspect of the invention, there is provided an image forming apparatus that forms an image on a cloth with a sublimation coloring material, the image forming apparatus including: a pretreatment liquid applying unit that applies a pretreatment liquid to the cloth; a drying unit that dries the cloth; and a sublimation coloring material applying unit that applies the sublimation coloring material to the cloth, wherein a heat source and the cloth are not in contact with each other in the drying unit.

As an embodiment of the present invention, from the viewpoint of exhibiting the effect of the present invention, it is preferable that the sublimation coloring material applying unit that applies the sublimation coloring material has a transfer unit that transfers a transfer image formed by applying an ink containing the sublimation coloring material onto a transfer medium to the cloth.

As an embodiment of the present invention, from the viewpoint of exhibiting the effect of the present invention, it is preferable that the cloth is dried by circulating warm air in the drying unit.

As an embodiment of the present invention, from the viewpoint that the dyeing properties to a cloth are high and the yellowing during heating and the discoloration in a high-humidity environment can be suppressed, it is preferable that the pretreatment liquid contains an organic solvent containing nitrogen or sulfur as a solvent, an application amount of the organic solvent immediately after the applying the pretreatment liquid is in a range of 10 to 150 mass % with respect to the mass of the entire cloth, and a residual amount of the organic solvent immediately before the transfer of the ink containing the sublimation coloring material onto the cloth in the transferring is in a range of 3 to 40 mass % with respect to the mass of the entire cloth.

As an embodiment of the present invention, it is preferable that the temperature in the step of drying the cloth is lower than the boiling point of the organic solvent, from the viewpoint of making it easy for the organic solvent to remain inside the cloth at a residual amount within an optimal range.

It is preferable that the temperature at which the cloth is dried is lower than a heating temperature at the time of transfer, from the viewpoint of suppressing the discoloration of a cloth white background portion due to heating.

Preferably, the pretreatment liquid contains an aromatic heterocyclic compound from the viewpoint that the dye in the sublimation ink is easily captured inside the fibers of the cloth and the dyeing density is increased.

It is preferable that the pretreatment liquid is applied by an inkjet method, from the viewpoint of enabling continuous performance with the step of applying a sublimation ink.

A feature of the image forming system of the present invention is an image forming system for dyeing by a sublimation transfer method a cloth including natural fibers, the system including: a pretreatment liquid applying unit that applies a pretreatment liquid to the cloth; a drying unit that dries the cloth; a sublimation ink applying unit that applies a sublimation ink to the transfer medium; and a transfer unit that transfers the sublimation ink from the transfer medium to the cloth. In the drying unit that dries the cloth, a heat source is not in contact with the cloth, the pretreatment liquid contains an organic solvent containing nitrogen or sulfur as a solvent, the application amount of the organic solvent immediately after the pretreatment liquid applying unit is within a range of 10 to 150 mass % with respect to the mass of the entire cloth, in addition, the residual amount of the organic solvent immediately before the sublimation ink is transferred to the cloth in the transfer unit is in a range of 3 to 40 mass % with respect to the mass of the entire cloth.

According to the following embodiments, it is possible to provide an image forming method, an image forming apparatus, and an image forming system in which a dyeing density is improved, and dyeing unevenness is reduced.

Although some embodiments of the present invention have been described, the scope of the present invention is not limited to the above-described embodiments and includes the scope of the invention described in the claims and its equivalent scope.

Although embodiments of the present invention have been described and illustrated in detail, the disclosed embodiments are made for purposes of illustration and example only and not limitation The scope of the present invention should be interpreted by terms of the appended claims Hereinafter, the present invention, constituent elements thereof, and modes and aspects for carrying out the present invention will be described in detail. In the present application, "to" is used to mean that numerical values described before and after "to" are included as a lower limit value and an upper limit value.

1. Outline of Image Forming Method

A feature of an image forming method according to an embodiment of the present invention is an image forming method for forming an image on a cloth with a sublimation coloring material, the image forming method including, in the following order: pretreatment liquid applying that is applying a pretreatment liquid to the cloth; drying that is drying the cloth; and sublimation coloring material applying that is applying the sublimation coloring material to the cloth, in which the pretreatment liquid contains an organic compound, and a heat source and the cloth are not in contact with each other in the drying.

In the present invention, it is possible to apply an appropriate amount of the pretreatment liquid without unevenness with high accuracy, thereby improving the dyeing density and reducing the dyeing unevenness. Therefore, the subsequent method of applying the sublimation coloring material is not particularly limited, and may be a sublimation transfer method, a direct method, or other methods.

Hereinafter, forming an image on a cloth by the sublimation transfer method is also simply referred to as "sublimation transfer".

The "sublimation transfer method" refers to a method in which an image (transfer image) is formed on a transfer medium using a sublimation coloring material (hereinafter, also referred to as a "sublimate dye" or a "sublimation dye"), and then the transfer medium and a cloth are heated and pressurized to fix the vaporized sublimation coloring material to the cloth, thereby forming an image.

In addition, the "direct method" refers to a method of forming an image by directly applying a sublimation coloring material to a cloth and then heating the cloth to fix the vaporized sublimation coloring material to the cloth.

The sublimation coloring material to be used is a dispersed dye and is not soluble in water (hydrophobic) but is dispersed in water by being mixed with a dispersant. The dispersed dye has good dyeing properties and is often used for dyeing hydrophobic chemical fibers.

By using a pretreatment liquid in combination, the pretreatment liquid can be applied to fibers having a relatively high hydrophilicity (e.g., fibers containing cellulose).

As described above, the present invention can be applied to a case where an image is formed with a sublimation coloring material after the pretreatment liquid is applied to the cloth.

In the present invention, the term "dyeing" refers to fixing a coloring matter on a cloth using a coloring material (dye), and the term "dyeing property" refers to the extent or degree of fixing of the coloring matter. In addition, "color development" refers to the development of a desired color on a cloth using a coloring material (dye), and "color developability" refers to the degree of coloration with respect to the desired color.

By using the image forming method of the present invention, an appropriate amount of the pretreatment liquid is evenly applied to the cloth after the application and drying of the pretreatment liquid, and thus an appropriate amount of the coloring matter can be evenly fixed to the cloth. That is, it is considered that the dyeing density is improved and the dyeing unevenness is reduced. In addition, it is considered that a color closer to a desired color can be developed on the cloth, that is, the coloring property is improved.

In addition, since the amount of waste liquid in each process is small in the formation of an image using a sublimation coloring material as compared with other image forming methods, a load on the environment can be reduced. As an image forming method in which the load on the environment is reduced, a method of directly forming an image on a cloth by an inkjet method is known. However, as compared with this method, the texture peculiar to the fiber can be left by the image formation with the sublimation coloring material.

The term "image" generally refers to an image obtained by visually fixing an event on a medium, and in the present invention, the image includes an image entirely dyed in one color, a character, a pattern, a picture, and the like.

(1) Cloth

The cloth is not particularly limited, but from the viewpoint of exhibiting the effects of the present invention, it is preferable that the cloth includes a fiber that is pretreated in advance so that an image can be formed by sublimation transfer, or the quality of the obtained image is improved.

Examples thereof include natural fibers such as cotton, hemp, wool, and silk, and chemical fibers such as vinylon, nylon, acryl, polyurethane, and acetate.

In addition, examples of a part of the chemical fiber include a regenerated fiber (rayon or the like) which is produced by once dissolving a natural fiber such as wood or cotton containing cellulose by a chemical reaction and spinning the fiber again.

Note that in general, an image can be formed using a sublimation coloring material on polyester without performing pretreatment in advance. However, in a case where the quality of an image to be obtained is improved (color development density is improved) by performing a pretreatment in advance on a polyester having relatively high hydrophilicity, the present invention can be applied.

From the viewpoint of exhibiting the effects of the present invention, the cloth preferably contains natural fibers. In addition, each cloth may be constituted of only one kind of natural fiber or two or more kinds of natural fibers. In addition, in a case where the cloth includes natural fibers, the cloth may be composed of only natural fibers or may be composed of natural fibers and chemical fibers. Here, the chemical fiber may be one kind or two or more kinds.

From the viewpoint of exhibiting the effects of the present invention, it is preferable that the cloth contains cellulose. Cellulose may be contained as a natural fiber or as the above-described regenerated fiber. In addition, each cloth may be constituted of only one kind of fibers containing cellulose or may be constituted of two or more kinds thereof. In addition, in a case where the cloth includes a fiber including cellulose and another fiber, the other fiber is preferably polyester.

The cloth may be any form of these fibers such as a woven cloth, a nonwoven cloth, or a knit cloth. Furthermore, the cloth may be a blended woven cloth or a blended nonwoven cloth of two or more kinds of fibers.

The natural fiber ratio and the chemical fiber ratio in the fibers constituting the cloth are expressed as mass % of the natural fibers and mass % of the chemical fibers contained with respect to the total mass of the cloth (the total amount of the natural fibers and the chemical fibers).

In a case where the cloth includes natural fibers and optional chemical fibers, a ratio of the natural fibers in the cloth is in a range of 5% to 100 mass %, and a ratio of the chemical fibers is preferably in a range of 0% to 95 mass %.

In addition, in a case where the cloth includes a fiber including cellulose and polyester, it is preferable that a ratio of the fiber including cellulose is in a range of 35% to 100 mass % and a ratio of the polyester is in a range of 0% to 65 mass % with respect to a total mass of the cloth.

2. Each Step of Image Forming Method

A feature of the image forming method of the present invention is including a step of applying a pretreatment liquid to cloth, a step of drying the cloth, and a step of applying a sublimation coloring material to the cloth, in this order.

Hereinafter, the step of applying a pretreatment liquid to a cloth is referred to as a "pretreatment liquid applying", the step of drying the cloth is referred to as a "pretreatment liquid drying", and the step of applying a sublimation coloring material to the cloth is referred to as a "sublimation coloring material applying".

As described above, the method of applying the sublimation coloring material is not particularly limited, and may be a sublimation transfer method, a direct method, or other methods.

FIG. 1 is a schematic diagram of an image forming apparatus (sublimation transfer method, continuous type) of the present invention. Hereinafter, a case of forming an image by the image forming method of the present invention using the image forming apparatus 400 will be briefly described.

The pretreatment liquid is applied to the cloth C fed from the cloth feeding section 101 in the pretreatment liquid applying section 103. Then, the cloth C1 to which the pretreatment liquid has been applied is dried in the pretreatment liquid drying section 104 to remove excess pretreatment liquid, thereby obtaining the cloth C2 to which an appropriate amount of pretreatment liquid has been applied.

Here, the step performed in the pretreatment liquid applying section 103 corresponds to the pretreatment liquid applying, and the step performed in the pretreatment liquid drying section 104 corresponds to the pretreatment liquid drying.

In addition, an ink containing a sublimation coloring material (hereinafter, also referred to as "sublimation ink") is applied to the transfer medium P fed from the transfer medium feeding section 201 in the inkjet recording section 203. The transfer medium P1 with the sublimation ink applied is dried in the ink drying section 204 to obtain the transfer medium P2 having the transfer image formed thereon.

Provided that the method of forming a transfer image is an example, it is not limited to this.

The cloth C2 to which an appropriate amount of the pretreatment liquid has been applied and the transfer medium P2 on which the transfer image has been formed are heated and pressurized in the transfer section 301, and the transfer image is sublimated and transferred to the cloth. Thereafter, the cloth and the transfer medium are released from each other, and the cloth N on which the image is formed and the transfer medium P3 after the heating and pressurizing are collected respectively.

However, the method of heating and pressurizing is an example, and the present invention is not limited thereto.

Here, the step performed in the transfer section 301 corresponds to the sublimation coloring material applying.

Figure 2:
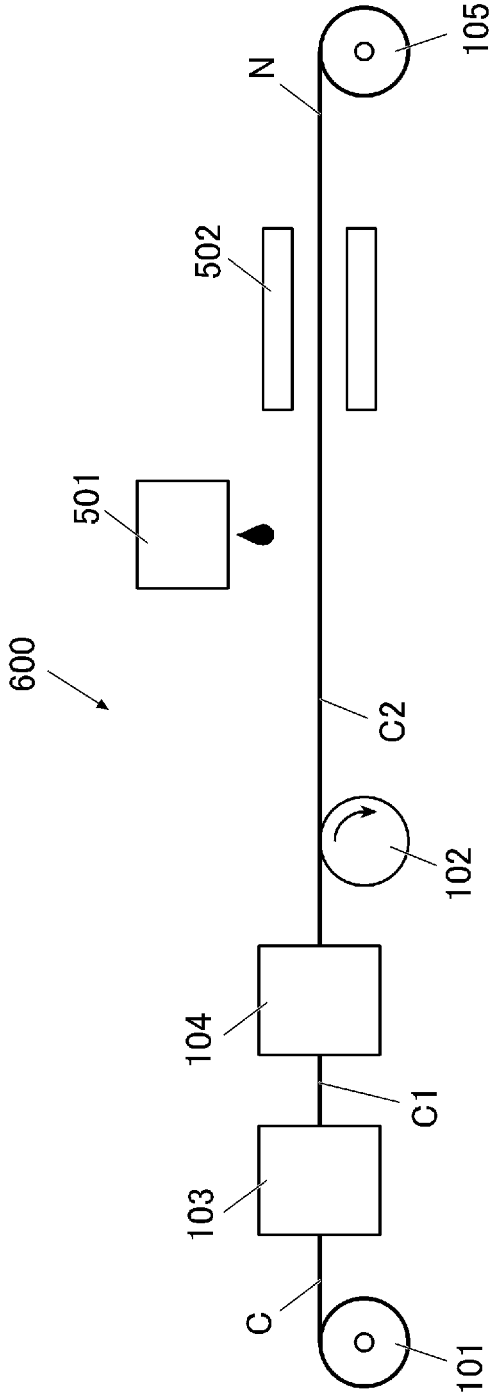
FIG. 2 is a schematic view of an image forming apparatus (direct system) according to the present invention.

FIG. 2 is a schematic view of an image forming apparatus (direct system) according to the present invention. Hereinafter, a case of forming an image by the image forming method of the present invention using the image forming apparatus 600 will be briefly described.

The pretreatment liquid is applied to the cloth C fed from the cloth feeding section 101 in the pretreatment liquid applying section 103. The cloth C1 to which the pretreatment liquid has been applied is dried in the pretreatment liquid drying section 104 to remove the excess pretreatment liquid, and the cloth C2 to which an appropriate amount of the pretreatment liquid has been applied is obtained.

Here, the process performed in the pretreatment liquid applying section 103 corresponds to the pretreatment liquid applying process, and the process performed in the pretreatment liquid drying section 104 corresponds to the pretreatment liquid drying process.

Next, the sublimation ink is applied to the cloth C2 to which an appropriate amount of the pretreatment liquid has been applied in the inkjet recording section 501, and the cloth to which the sublimation ink has been applied is heated in the ink heating section 502. Then, the sublimated ink is fixed to the cloth, and the cloth N on which the image is formed is collected.

Here, the step performed in the inkjet recording section 501 and the ink heating section 502 corresponds to the sublimation coloring material applying.

Hereinafter, each of the steps in the image forming method will be described in detail.

(1) Pretreatment Liquid Applying

The pretreatment liquid applying is a step of applying a pretreatment liquid to the cloth. In addition, the pretreatment liquid contains an organic compound.

Here, the "organic compound" is not particularly limited, but is preferably an organic compound which has a swelling property with respect to a cloth and has a dissolving property (has a swelling function or a dissolving function) with respect to a sublimation coloring material described below and is an organic solvent. Hereinafter, the solvent that dissolves the sublimation coloring material is referred to as "organic solvent A" as an example.

(1.1) Pretreatment Liquid

The pretreatment liquid contains an organic solvent A.

The pretreatment liquid may be composed of only the organic solvent A or may further contain a coloring material capturing compound and, if necessary, other components.

(1.1.1) Configuration of Pretreatment Liquid (1.1.1.1) Organic Solvent A

The pretreatment liquid contains an organic solvent A.

As described above, the organic solvent A has swelling properties with respect to the cloth and has solubility of the sublimation coloring material.

In the present invention, the term "swelling" means that the fiber contained in the cloth absorbs a substance increases the volume.

Therefore, "having swelling properties with respect to a cloth" means having a property in which the volume of fibers increases by being absorbed by the fibers.

The pretreatment liquid, that is, the organic solvent A, is applied to the cloth. Thus, it is conceivable that the fibers contained in the cloth swell and the sublimation coloring material easily enters the fibers via the organic solvent A, thereby improving the dyeing property.

The organic solvent A is not particularly limited as long as it is an organic solvent having a swelling property with respect to cloth and having solubility of a sublimation coloring material. In particular, the value of the ratio of the inorganic value to the organic value (I/O value) is preferably within a range of 1.0 to 5.0, more preferably within a range of 1.0 to 3.0, and still more preferably within a range of 1.5 to 2.0.

When the I/O value is within the above range, the inside of the fiber included in the cloth is likely to swell. Along with this, since the organic solvent A serves as a carrier for the sublimation coloring material, the sublimation coloring material easily enters the inside of the fibers. In this manner, the sublimation coloring material is more easily fixed, and the dyeing density can be improved, and the dyeing unevenness can be reduced in the cloth on which an image is formed.

The "I/O value" is a value of a ratio of an inorganic value (I) to an organic value (O) (inorganic value/organic value), is also referred to as an "IOB value" (Inorganic Organic Balance: IOB) and is one of indexes indicating the magnitude of the polarity of a compound.

The I/O value is described in detail in documents such as Organic Conceptual Diagram (written by Masashi Koda, Sankyo Shuppan (1984)); KUMAMOTO PHARMACEUTICAL BULLETIN, Vol. 1, Items 1 to 16 (1954); and Kagaku no Area, Vol. 11, No. 10, Items 719 to 725 (1957). The I/O value is a value obtained by organic conceptually handling the polarity of a compound. This method is one of functional group contribution methods for setting a parameter for each functional group, and an inorganic value and an organic value are shown for each functional group. The I/O value is obtained by roughly classifying the properties of a compound into an organic group showing a covalent bonding property and an inorganic group showing an ionic bonding property, and positioning the organic group and the inorganic group at respective points on orthogonal coordinates called an organic axis and an inorganic axis.

Here, the "inorganic value (I)" is obtained by quantifying the magnitude of the influence of various substituents, bonds, and the like that the organic compound has on the boiling point, with a hydroxy group as a reference. Specifically, in a case where the distance between the boiling point curve of the linear alcohol and the boiling point curve of the linear paraffin is taken in the vicinity of 5 carbon atoms, the temperature is about 100 ° C., and thus the influence of one hydroxy group is set to 100 as a numerical value. A value obtained by quantifying the influence of various substituents or various bonds on the boiling point on the basis of this numerical value is the inorganic value (I) of the substituent contained in the organic compound. For example, the inorganic value (I) of a-COOH group is 150, and the inorganic value (I) of a double bond is 2. Therefore, the inorganic value (I) of a certain organic compound means the total sum of the inorganic values (I) of various substituents, bonds, or the like possessed by the compound.

The "organic value (O)" is determined based on the influence of a carbon atom representing a methylene group on the boiling point, with the methylene group in the molecule as a unit. That is, since the average value of the increase in boiling point due to the addition of one carbon is 20° C. in the vicinity of 5 to 10 carbon atoms of a straight-chain saturated hydrocarbon compound, the organic value of one carbon atom is determined to be 20 based on this value. Based on this, a value obtained by digitizing the influence of various substituents or bonds on the boiling point is an organic value (O). For example, the organic value (O) of a nitro group ($-NO_2$) is 70.

Generally, an I/O value closer to 0 indicates a non-polar (hydrophobic, highly organic) organic substance. On the other hand, a larger value indicates a polar (hydrophilic and inorganic) organic substance.

Examples of the organic solvents A having an I/O value of 1.0 or more include 2-pyrrolidone (I/O value: 1.15), ethylene glycol mono-ethylene ether (I/O value: 1.5), dimethyl sulfoxide (I/O value: 1.75), butyric acid (I/O value: 1.875), polyethylene glycol (I/O value: 2.0), isobutyric acid (I/O value: 2.143), 2,3-butanediol (I/O value: 2.5), trimethylolethane (I/O value: 3.0), propyleneglycol (I/O value: 3.3), polypropyleneglycol (I/O value: 3.3), and ethyleneglycol (I/O value: 5.0). From the viewpoint that the fibers of the cloth can be swollen and the discoloration and fading of the cloth on which an image is formed can be suppressed, dimethyl sulfoxide, ethylene glycol, and propylene glycol are preferable, and among these, dimethyl sulfoxide is more preferable.

Furthermore, the boiling point of the organic solvent A is preferably within a range of 170 to 250° C. Examples of the organic solvents A having a boiling point in the range of 170 to 250° C. include propylene glycol (boiling point 188° C.), ethylene glycol (boiling point 197° C.), dimethyl sulfoxide (boiling point 189° C.), and 2,3-butanediol (boiling point 177° C.).

The content of the organic solvent A is preferably within a range of 5 to 100 mass %, more preferably within a range of 35 to 100 mass %, and still more preferably within a range of 50 to 100 mass % with respect to the total mass of the pretreatment liquid, from the viewpoints of dyeing density and dyeing unevenness.

(1.1.1.2) Coloring Material Capturing Compound

The pretreatment liquid preferably further contains a coloring material capturing compound.

By containing the coloring material capturing compound, the dyeing density can be improved. In addition, discoloration and fading of a cloth on which an image is formed can be suppressed.

Here, the term "discoloration/fading" refers to discoloration (change in hue) and fading (color fading) over time.

By applying the organic solvent A to the cloth, the fibers included in the cloth are swollen, and the sublimation coloring material easily enters the fibers through the organic solvent A. Provided that in order to improve the dyeing density, it is further necessary to fix the sublimation coloring material in the fiber.

Since the sublimation coloring material is hydrophobic, the sublimation coloring material is easily fixed in the fiber with hydrophobic polyester. However, for example, it is difficult to fix the sublimation coloring material with a fiber containing cellulose having a large number of hydroxy groups which are hydrophilic groups.

Therefore, by applying the coloring material capturing compound to the cloth, the sublimation coloring material is easily fixed even to the cloth containing hydrophilic fibers.

The method of applying the coloring material capturing compound to the cloth is not particularly limited, but it is preferable that the pretreatment liquid further contains the coloring material capturing compound.

In the present invention, the "coloring material capturing compound" refers to a compound having a function of capturing a coloring material (coloring material capturing ability). Specifically, it refers to a compound having an Rf value of less than 1 as determined by the following paper chromatography method.

In addition, from the viewpoint of the coloring material capturing ability, the Rf value of the coloring material capturing compound obtained by a paper chromatography method is preferably 0.7 or lower, more preferably or lower, still more preferably 0.3 or lower, and still more preferably 0.2 or lower.

Paper Chromatography Method

Procedure 1: Cellulose filter paper is impregnated with a 10% solution of the coloring material capturing compound and then dried to produce a carrier.

Procedure 2: A 0.1% solution of the sublimation coloring material in tetrahydrofuran is spotted on a carrier and then dried to prepare a development sample.

Procedure 3: The developed sample is developed with acetonitrile at 25° C. for 3 minutes.

Procedure 4: An Rf value is obtained from the following equation.

Rf value=development distance of sublimation coloring material/development distance of acetonitrile Hereinafter, the details of each procedure will be described.

Procedure 1

5C cellulose filter paper defined in JIS P 3801:1995 is impregnated with the 10% solution of the coloring material capturing compound and then dried to prepare a carrier. The solvent used in the 10% solution of the coloring material capturing compound is not particularly limited as long as it is a solvent capable of dissolving the coloring material capturing compound, and the organic solvent A or the like that can be contained in the pretreatment liquid can be used. The shape of the cellulose filter paper is not particularly limited, and for example, may be a strip shape. The size of the cellulose filter paper is not particularly limited but needs to be a size that allows sufficient development in Procedure 3. The impregnation of the cellulose filter paper with the solution is performed by immersing the cellulose filter paper in the solution for 1 minute. The drying conditions are not particularly limited as long as it can be sufficiently dried to such an extent that the mass of the carrier is stabilized under an environment of 25° C. and 50% RH.

Procedure 2

A 0.1% tetrahydrofuran solution of a sublimation coloring material described below is spotted on a carrier and dried to prepare a developed sample. Spotting of the solution can be performed using a capillary. The volume of the solution to be spotted is preferably within a range of 0.5 to 2 μL, more preferably 1 μL. The position of the spot is a position of a 1 cm from the lower end of the cellulose filter paper. The drying conditions are not particularly limited as long as the sample can be sufficiently dried such that the mass of the developed sample is stabilized in an environment of 25° C. and 50% RH.

Procedure 3

The developed sample is developed with acetonitrile at 25° C. for 3 minutes. Specifically, the developed sample is placed in a developing tank containing acetonitrile so that the portion spotted in Procedure 2 is not immersed in acetonitrile. The developing tank is covered and developed. The development time is 3 minutes after the cellulose filter paper is immersed in acetonitrile.

Procedure 4

The Rf value is determined from the following equation.

Rf value =development distance of sublimation coloring material/development distance of acetonitrile The "development distance of the sublimation coloring material" is a distance from the center of the portion spotted in the procedure 2 to a position where the color is darkest in the spot after development. In a case where it is difficult to discriminate the position with the darkest color, the distance is the distance from the center of the portion spotted in the procedure 2 to the center of the leading end and the rear end of the spot.

The "development distance of acetonitrile" is a distance from the center of the portion spotted in procedure 2 to the tip of the acetonitrile after development.

The Rf value may be an average value obtained by performing measurement a plurality of times in consideration of measurement accuracy.

The coloring material capturing compound is not particularly limited as long as it is a compound having a coloring material capturing ability, specifically, a compound having an Rf value of less than 1. Provided that the compound is preferably a compound having an aromatic ring (aromatic compound), and more preferably a compound having an aromatic heterocycle (aromatic heterocyclic compound).

In the present invention, the "aromatic heterocycle" refers to an aromatic ring composed of carbon and a heteroatom other than carbon. The case where the element constituting the aromatic ring is only carbon and a heteroatom constitutes a substituent to be substituted on the aromatic ring is not included.

The heteroatom constituting the aromatic heterocycle included in the aromatic heterocyclic compound is preferably an oxygen atom, a nitrogen atom, or a sulfur atom, and more preferably a nitrogen atom, from the viewpoint of the coloring material capturing ability.

Examples of the aromatic heterocyclic ring contained in the aromatic heterocyclic compound include a pyrazole ring; triazole ring; imidazole ring; triazine ring; pyridine ring; pyrazole ring; acridine ring; indole ring; quinoline ring; pyrrole ring ring and a thiophen ring. Among these, a pyrazole ring, a triazole ring, or an imidazole ring is preferable from the viewpoint of the coloring material capturing force.

The aromatic heterocyclic compound preferably has three or more aromatic rings, and more preferably has five or more aromatic rings. In addition, it is preferable to have a structure in which two aromatic rings are bonded to each other through a single bond as a part or the whole. In a case where the aromatic heterocyclic compound has these structures, the aromaticity becomes high, and thus the π-π interaction with the sublimation coloring material becomes strong. In this manner, the coloring material capturing ability is improved, and the discoloration can be further suppressed.

The solubility of the coloring material capturing compound in the solvent included in the pretreatment liquid at 25° C. and 1 atm is preferably 10 mass % or more. As the solubility in the solvent increases, the coloring material capturing compound easily enters the inside of the fibers contained in the cloth in a dissolved state, and thus the coloring material capturing ability is improved and the dyeing density can be further improved. In addition, from the viewpoint of being able to efficiently capture the sublimation coloring material, the coloring material capturing compound preferably has a low molecular weight. The term "low molecular weight" as used herein refers to, for example, a molecular weight of 200 to 1000.

The coloring material capturing compound is exemplified. Note that the coloring material capturing compound according to the present invention is not limited thereto.

compound (1)

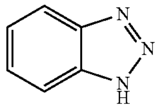

compound (2)

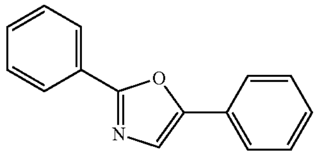

compound (3)

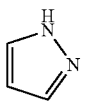

compound (4)

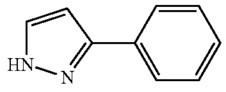

-continued compound (5)

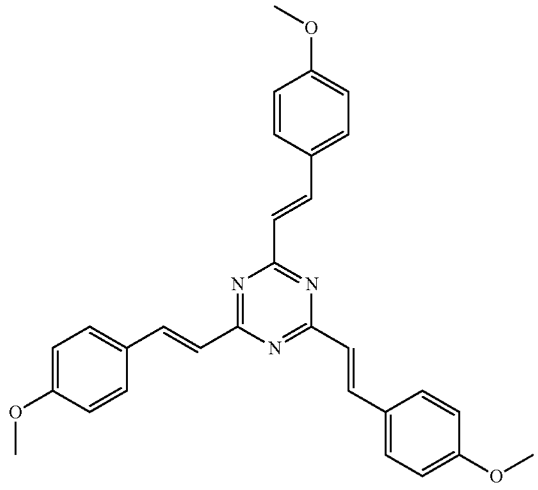

compound (6)

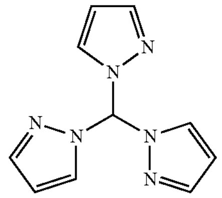

compound (7)

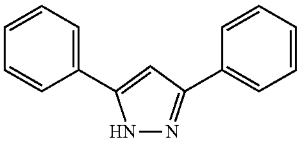

compound (8)

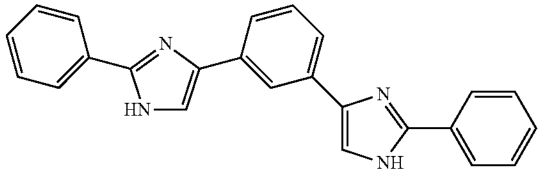

compound (9)

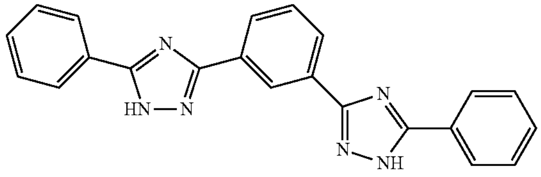

compound (10)

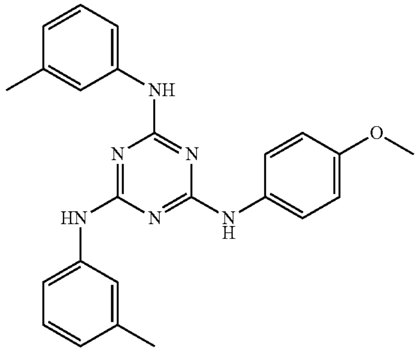

-continued compound (11)

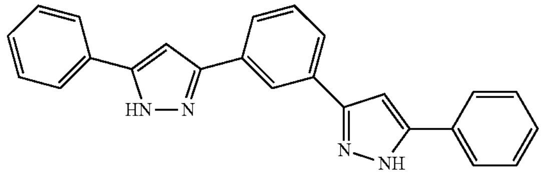

compound (12)

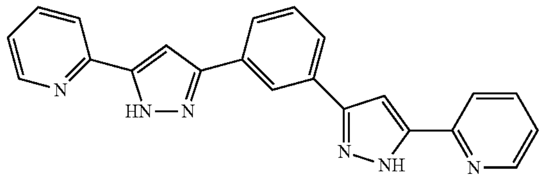

compound (13)

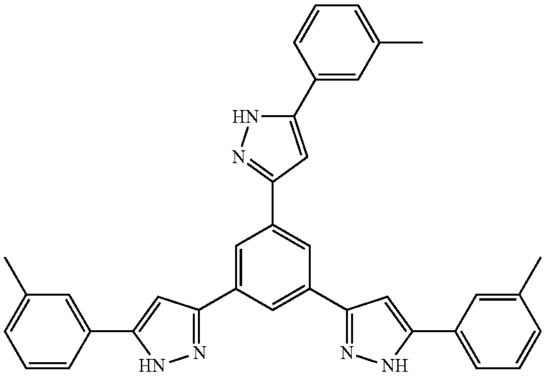

From the viewpoint of the coloring material capturing ability, the content of the coloring material capturing compound is preferably in a range of 1 to 30 mass % and more preferably in a range of 10 to 20 mass % with respect to the total mass of the pretreatment liquid.

(1.1.1.3) Other Components

The pretreatment liquid may further contain other components than those described above, as necessary. Examples of other components include water, surfactants, preservatives, pH adjusters, and the like.

Examples of water include ion-exchanged water, distilled water, and pure water. The content of water is preferably in a range of 0 to 95 mass % and more preferably in a range of 0 to 50 mass % with respect to the total mass of the pretreatment liquid.

The surfactant can be used without particular limitation. In a case where the constituent component of the ink contains an anionic compound, the ionicity of the surfactant is preferably anionic or nonionic, and in a case where the ionicity is amphoteric, the surfactant is preferably a betaine type.

Specifically, fluorine-based or silicone-based surfactants having a high ability to reduce static surface tension, anionic surfactants such as dioctyl sulfosuccinate and sodium dodecyl sulfate having a high ability to reduce dynamic surface tension, and nonionic surfactants such as polyoxyethylene alkyl ethers having a relatively low molecular weight, polyoxyethylene alkylphenyl ethers, acetylene glycols, Pluronic-type surfactants (Pluronic is a registered trademark), and sorbitan derivatives are preferably used. It is also preferable that a fluorine-based or silicone-based surfactant and a surfactant having a high dynamic surface tension reducing ability are used in combination.

Examples of preservatives include aromatic halogen compounds (e.g., PreventolCMK), methylene dithiocyanate, halogen-containing nitrogen-sulfur compounds, 1,2-benzisothiazolin-3-one (e.g., PROXELGXL), and the like.

Examples of the pH adjuster include citric acid, sodium citrate, hydrochloric acid, and sodium hydroxide.

(1.1.2) Physical Properties of Pretreatment Liquid

The viscosity at 25° C. of the pretreatment liquid can be appropriately adjusted by a method of applying the pretreatment liquid to a cloth. For example, in a case where the pretreatment liquid is applied by an inkjet method, the viscosity of the pretreatment liquid is preferably in a range of 3 to 20 mPa·s. In addition, the viscosity of the pretreatment liquid can be measured with an E type viscometer at 25° C.

(1.2) Pretreatment Liquid Application Method

In the pretreatment liquid applying, the pretreatment liquid is applied to at least a part of the surface of the cloth. The application of the pretreatment liquid may be performed on the entire surface of the cloth or may be selectively performed only on a region where an image is formed with the sublimation coloring material according to the image to be formed.

As the method for applying the pretreatment liquid to the cloth, known methods can be used without particular limitation Examples of the method include a spray method, a mangle method (a pad method or a dipping method), a coating method, and an inkjet method. The temperature of the pretreatment liquid is not particularly limited, but is preferably within a range of 15 to 30° C.

From the viewpoint of applying a predetermined amount of the pretreatment liquid in a short time, the mangle method or the coater method is preferable. In the mangle method, the amount of the pretreatment liquid to be applied can be adjusted by immersing the cloth in the pretreatment liquid stored in a bath, passing the cloth through a roller under pressure, and squeezing the cloth.

In addition, an inkjet method is preferable from the viewpoint that the pretreatment liquid applying, the pretreatment liquid drying, and the transferring can be continuously performed.

The application amount of the pretreatment liquid to the cloth is not particularly limited and can be adjusted according to the content of the solvent and the like in the pretreatment liquid, the application amount of the sublimation ink, and the like.

(2) Pretreatment Liquid Drying

The pretreatment liquid drying is a step of drying the cloth to which the pretreatment liquid has been applied. In addition, in the pretreatment liquid drying, the heat source and the cloth are not in contact with each other.

In a case where an image is formed with a sublimation coloring material using the pretreatment liquid, in order to reduce uneven dyeing, it is preferable to uniformly apply an appropriate amount of the pretreatment liquid to the cloth.

Examples of methods for uniformly applying an appropriate amount of the pretreatment liquid include a method in which the cloth is immersed in the pretreatment liquid and a method in which the pretreatment liquid is applied to the cloth by an inkjet method. In addition, by drying the cloth after the pretreatment liquid is applied, it is possible to suppress the pretreatment liquid from being carried in a step performed thereafter, for example, the step of applying a sublimation coloring material. That is, productivity can be improved.

The inventors of the present invention has studied this conventional technique and has found that the cloth cannot be uniformly dried depending on the drying method of the cloth, and drying unevenness occurs.

Further, as a result of repeated studies by the present inventors, it has been found that these problems are relatively likely to occur in the contact drying method and are unlikely to occur in the non-contact drying method.

Hereinafter, a contact type drying method and a non-contact type drying method will be described in comparison with each other.

Methods for drying cloth are broadly classified into a contact type in which a heat source and cloth are brought into contact with each other for drying and a non-contact type in which a heat source and cloth are not brought into contact with each other for drying.

In the contact type, heat is easily transmitted to a portion of the cloth which is relatively close to the heat source, and thus drying easily progresses. On the other hand, heat is less likely to be transferred to a portion relatively far from the heat source, and drying is less likely to proceed. Therefore, drying unevenness is likely to occur due to the difference in distance from the heat source.

In addition, since the heat source and the cloth are brought into contact with each other, in a case where the temperature of the entire heat source is not uniform and there is temperature unevenness, temperature unevenness also occurs in the cloth to be heated, and drying unevenness easily occurs.

For example, in a case where drying is performed while the surface of the cloth and a hot plate are in contact with each other, concentration unevenness of the pretreatment liquid occurs in a thickness direction of the cloth. In addition, due to the temperature unevenness of the hot plate itself, temperature unevenness also occurs in the heated cloth, and drying unevenness easily occurs.

Further, since the end portion of the hot plate (the end portion of the heat source) is in contact with the outside air, heat or vapor easily escapes, and drying easily proceeds. Therefore, in the cloth, drying unevenness is likely to occur between a portion dried by contact with the end portion of the hot plate and a portion dried by contact with the central portion of the hot plate.

On the other hand, in the non-contact type, the distance from the heat source is overwhelmingly far compared to the contact type, and the drying unevenness due to the difference in distance from the heat source is extremely small In addition, since the entire cloth can be heated at a uniform temperature, drying is likely to proceed uniformly.

Further, since the heat source and the cloth are not brought into contact with each other, even if the temperature of the entire heat source is not uniform and there is temperature unevenness, the temperature unevenness is unlikely to occur in the cloth to be heated. As a result, uneven drying is less likely to occur.

In addition, since it is possible to cause drying to proceed relatively slowly by appropriately adjusting conditions such as drying temperature and time in a non-contact manner, it is easy to remove the excess pretreatment liquid with high accuracy. In addition, rapid evaporation of the pretreatment liquid can be suppressed.

From the viewpoint of suppressing drying unevenness in a relatively short time, it is preferable to heat the cloth, and the heating temperature is preferably within a range of 100° C. to 200° C.

Examples of the method of heating and drying the cloth in a non-contact manner include warm air, an electric heater, and an infrared heater.

(2.1) Drying By Warm Air Circulation

In the pretreatment liquid drying , the cloth is preferably dried by circulating warm air.

By drying the cloth by circulating the warm air, the temperature in the drying device can be kept uniform. In addition, the gas component of the evaporated pretreatment liquid can be easily removed (exhausted) from the drying device.

Figure 3:
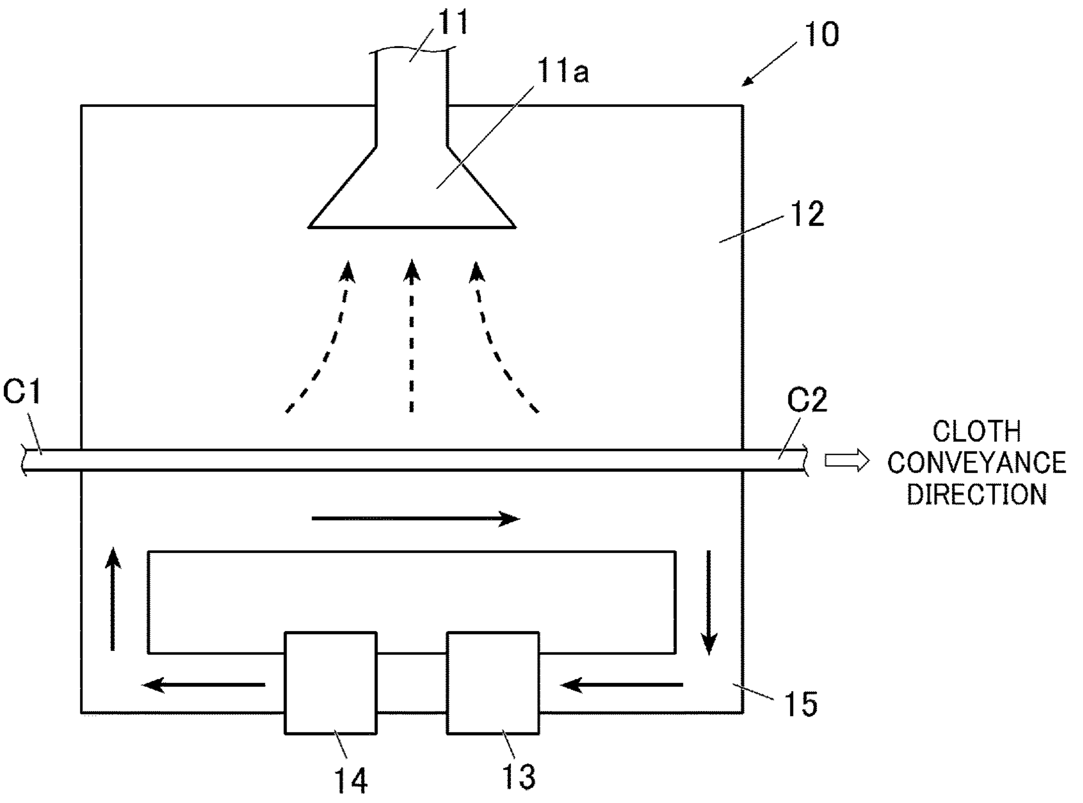
FIG. 3 is a schematic view showing a configuration of an example of a drying section that circulates warm air to dry a cloth.

FIG. 3 is a schematic view showing a configuration of an example of a drying section that circulates warm air to dry a cloth.

The pretreatment liquid drying section 10 dries the cloth to which the pretreatment liquid has been applied. The cloth C1 to which the pretreatment liquid has been applied is fed into the drying chamber 12 along the cloth conveyance direction and is dried with circulating warm air (solid arrow) in the drying chamber 12. Then, the cloth is sent out from the drying chamber 12 as a cloth C2 to which an appropriate amount of the pretreatment liquid is applied.

Note that it is preferable to adopt a configuration in which the cloth does not come into contact with the guide roller that supports the cloth, the conveyance surface, or the like inside the drying chamber. It may be supported by a guide roller, a conveyance surface or the like outside the drying chamber.

In the pretreatment liquid drying section 10, the drying chamber 12 is connected to a circulation path 15 for warm air. A heat source 13 for heating the air to be circulated at any time and keeping the circulating warm air at a constant temperature and a blower 14 for circulating the warm air are provided in the circulation path 15. In addition, a wind pressure adjusting unit (not shown) that adjusts the wind pressure of the circulating warm air may be provided. As the wind pressure adjustment unit, for example, a variable damper, an output adjustment device of an inverter type blower, or the like is exemplified.

The circulating warm air circulates in the circulation path 15 in the direction of the solid arrows shown in FIG. 3. Specifically, the warm air sent from the blower 14 comes into contact with the cloth and then circulates in a direction parallel to the conveying direction of the cloth to dry the cloth. By circulating the warm air in the direction parallel to the conveyance direction of the cloth in this way, it is possible to prevent the cloth from fluffing and yarn breakage.

Examples of the heat source 13 include an electric heater, a gas heater, an infrared heater, and a heat medium heater. The temperature of the warm air is detected by a thermometer installed at any position in the drying chamber 12, and the output of the heat source is adjusted according to the detection result, whereby the temperature of the circulating warm air can be kept constant at all times.

The pretreatment liquid drying section 10 suctions air in the drying chamber 12 by the suction section 11 and discharges the air to the outside of the drying chamber. Thus, a gas component of the evaporated pretreatment liquid can be removed. The suction section preferably includes, for example, a suction fan.

A suction port 11*a* (suction position) of the suction section 11 is preferably provided on the opposite side to the circulating path 15 with the cloth interposed therebetween. Thus, gas components of the pretreatment liquid evaporated from the cloth flow in a direction away from the heat sources 13 together with the air in a direction of a dashed arrow illustrated in FIG. 3 and enter the suction port 11*a*. Next, it is ejected from the drying chamber 12. The suction section 11 may have a mechanism for capturing and removing a predetermined component from the suctioned air.

It is preferable to appropriately adjust the suction speed so as to sufficiently suck the gas component of the evaporated pretreatment liquid and to maintain the temperature of the circulating warm air at a constant level. To be specific, it is preferable to adjust the wind velocity on the side of the cloth to which the sublimation coloring material is applied to be in the range of 0.1 to 10. 0 m/sec.

The drying chamber 12 may be provided with an opening for the purpose of conveying the cloth, but the opening is preferably provided to such an extent that the temperature and the flow of air in the drying chamber 12 are not significantly disturbed. For example, it is preferable to have a mechanism capable of adjusting the opening area as necessary, a seal structure for reducing the amount of ventilation inside and outside the drying chamber, and the like.

In addition, in order to reduce wind speed unevenness of the warm air in the drying chamber 12, a rectifying plate may be installed in the drying chamber 12 or the circulation path 15.

In the case where stains are generated due to drying, it is necessary to prevent the stains from adhering to the cloth. Therefore, it is preferable to provide a mechanism for collecting dirt in the circulation path 15. Examples of the member for collecting dirt include a metal filter and a scrubber, and it is preferable to appropriately select the member according to the type of dirt generated.

From the viewpoint of removing the excess pretreatment liquid with high accuracy, the temperature of the heat source is preferably adjusted so that the temperature on the side of the cloth to which the sublimation coloring material is applied is in the range of 100 to 200° C.

From the viewpoint of suppressing drying unevenness of the cloth, it is preferable to reduce temperature unevenness in the drying chamber. Specifically, the difference between the maximum temperature and the minimum temperature in the drying chamber is preferably 15° C. or less, more preferably 10° C. or less, and even more preferably 5° C. or less. The temperature unevenness in the drying chamber can be reduced by using a mechanism capable of rectifying warm air, constituting the pretreatment liquid drying section with a material having excellent heat insulation performance, or the like.

The wind direction of the warm air is preferably a direction parallel to the conveyance direction of the cloth, and specifically, is preferably within a range of ±30°. In addition, the wind speed is preferably within a range of 2 to m/s. By being 2 m/s or more, the temperature unevenness of the warm air is reduced, and by being 10 m/s or less, damage to the cloth can be suppressed.

A drying time of the cloth, that is, a time for which the cloth stays in the drying chamber is preferably in a range of 10 to 300 seconds. When the amount is within the above range, the excess pretreatment liquid can be removed with high accuracy.

(3) Sublimation Coloring Material Applying

The sublimation coloring material applying is a step of applying a sublimation coloring material to the cloth.

In the present invention, a sublimation ink containing a sublimation coloring material is preferably applied to a cloth.

(3.1) Sublimation Ink

The sublimation ink preferably contains a sublimation coloring material and further contains water, an organic solvent, a dispersant, and the like.

(3.1.1) Configuration of Sublimation Ink

(3.1.1.1) A Sublimation Coloring Material

In the present invention, the term "sublimation coloring material" refers to a coloring material having a property of sublimating by heating. Among these, a disperse dye in which a dye that is insoluble or poorly soluble in water is formed into fine particles and dispersed in water is preferable.

Here, the phrase "insoluble or poorly soluble in water" means that the solubility in water at 25 ° C. is 10 mg/L or less. Note that the water-solubility of the sublimation coloring material used in the present invention at 25 ° C. is preferably 5 mg/L or less, more preferably 1 mg/L or less.

The chemical structure of the sublimation coloring material is not particularly limited, but preferably has a plurality of aromatic rings. By having a plurality of aromatic rings, the π-π interaction with the coloring material capturing compound acts strongly, and the sublimation coloring material is more easily fixed to the cloth.

Examples of the disperse dye among the sublimation coloring materials include the following dyes.

C.I.DisperseYellow3, 4, 5, 7, 9, 13, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 114, 116, 118, 119, 122, 124, 126, 135, 140, 141, 149, 160, 162, 163, 164, 165, 179, 180, 182, 183, 186, 192, 198, 199, 202, 204, 210, 211, 215, 216, 218, 224, and the like, C.I.DisperseOrange1, 3, 5, 7, 11, 13, 17, 20, 21, 25, 29, 30, 31, 32, 33, 37, 38, 42, 43, 44, 45, 47, 48, 49, 53, 54, 55, 56, 57, 58, 59, 61, 66, 71, 73, 76, 78, 80, 89, 90, 91, 93, 96, 97, 119, 127, 130, 139, 142, and the like, CI.DisperseRed1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 288, 289, 298, 302, 303, 310, 311, 312, 320, 324, 328, and the like, CI.DisperseViolet1, 4, 8, 23, 26, 27, 28, 31, 33, 35, 36, 38, 40, 43, 46, 48, 50, 51, 52, 56, 57, 59, 61, 63, 69, 77, and the like, CI.DisperseGreen9 and the like, CI.DisperseBrown1, 2, 4, 9, 13, 19, and the like, CI.DisperseBlue3, 7, 9, 14, 16, 19, 20, 26, 27, 35, 43, 44, 54, 55, 56, 58, 60, 62, 64, 71, 72, 73, 75, 79, 81, 82, 83, 87, 91, 93, 94, 95, 96, 102, 106, 108, 112, 113, 115, 118, 120, 122, 125, 128, 130, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 267, 268, 270, 284, 285, 287, 288, 291, 293, 295, 297, 301, 315, 330, 333, 359, 360, and the like, and CI.DisperseBlack1, 3, 10, 24 and the like can be exemplified.

Among these, it is preferable to use C.I.DisperseYellow54, C.I.DisperseOrange25, C.I.DisperseRed60, C.I.DisperseBlue14, 359 and 360.

The molecular weight of the sublimation coloring material is not particularly limited, but from the viewpoint of making it easier to sublimate the sublimation coloring material, the molecular weight is preferably small (e.g., within a range of 200 to 350). On the other hand, the molecular weight is preferably moderately large (e.g., in the range of 350 to 500) from the viewpoint of making it difficult for the sublimation coloring material that has permeated into the cloth to escape.

The sublimation coloring material contained in the sublimation ink may or may not be crystallized The average particle diameter of the sublimation coloring material in the sublimation ink is not particularly limited but is preferably 300 nm or less from the viewpoint of jetting stability in an inkjet method. The mean particle size can be determined with a commercially available particle size measuring instrument using a light scattering method, an electrophoretic method, a laser Doppler method or the like, and examples of the particle size measuring instrument include Zetasizer 1000 manufactured by Malvern Corporation.

The content of the sublimation coloring material is not particularly limited, but is preferably in a range of 2 to 10 mass % with respect to the total mass of the sublimation ink. In a case where the content of the sublimation coloring material is 2 mass % or more, a high-density image is easily formed. On the other hand, when the content is 10 mass % or less, the viscosity of the sublimation ink does not become excessively high, and thus the ejection stability is less likely to be impaired. The content of the sublimation coloring material is more preferably within a range of 5 to 10 mass % with respect to the total mass of the sublimation ink from the same viewpoint.

(3.1.1.2) Water

The sublimation ink may contain water. Examples of water include ion-exchanged water, distilled water, and pure water.

The content of water is preferably in a range of 40 to 98 mass % and more preferably in a range of 50 to with respect to the total mass of the sublimation ink.

(3.1.1.3) Organic Solvent

The sublimation ink may contain an organic solvent, and among these, a water-soluble organic solvent is preferable.

The total content of water and the water-soluble organic solvent is preferably in a range of 90 to 98 mass % and more preferably in a range of 90 to 95 mass % with respect to the total mass of the sublimation ink.

Examples of the water-soluble organic solvents include alcohols (e.g., methanol, ethanol, propanol, pentanol, hexanol, cyclohexanol, benzyl alcohol), polyhydric alcohols (e.g, ethylene glycol, diethylene glycol, triethylene glycol, polyethylene glycol, propylene glycol, dipropylene glycol, tripropylene glycol, polypropylene glycol, glycerin, a compound represented by the following general formula (1)), polyhydric alcohol ethers (e.g, ethylene glycol monomethyl ether, ethylene glycol monoethyl ether, ethylene glycol monobutyl ether, ethylene glycol monophenyl ether, diethylene glycol monomethyl ether, diethylene glycol monoethyl ether, diethylene glycol monobutyl ether, diethylene glycol dimethyl ether, propylene glycol monomethyl ether, propylene glycol monoethyl ether), amines (e.g, ethanolamine, N-ethyldiethanolamine, morpholine, N-ethylmorpholine, ethylenediamine, diethylene diamine, triethylenetetramine), amides (e.g, formamide, N,N-dimethylformamide, N,N-dimethylacetamide), heterocycles (e.g, 2-pyrrolidone, N-methyl-2-pyrrolidone, N-cyclohexyl-2-pyrrolidone, 2-oxazolidone, 1,3-dimethyl-2-imidazolidine), sulfoxides (e.g, dimethyl sulfoxide), sulfones (e.g, sulfolane).

General Formula (1)

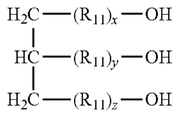

In General Formula (1), $R_{11}$ all represent an ethylene glycol group or a propylene glycol group, x, y, and z are all positive integers, and x+y+z=3 to 30.

In a case where the cloth contains a hydrophilic fiber such as a natural fiber or a synthetic cellulose fiber, from the viewpoint of promoting the permeation of the sublimation ink into the cloth and from the viewpoint stability in an inkjet method, it is preferable that the sublimation ink hardly thickens due to drying. Therefore, it is preferable that the sublimation ink contains a high-boiling point solvent having a boiling point of 200° C. or more among water-soluble organic solvents.

Examples of the high boiling point solvent having a boiling point of 200° C. or more include polyols and polyalkylene oxides. Specific examples of the polyols having a boiling point of 200° C. or more include, but are not limited to, divalent alcohols such as 1,3-butanediol (boiling point of 208° C.), 1,6-hexanediol (boiling point of 223° C.), and polypropylene glycol; and alcohols having 3 or more valences such as glycerin (boiling point of 290° C.) and trimethylolpropane (boiling point of 295° C.). Specific examples of the polyalkylene oxides having a boiling point of 200° C. or more include, but are not limited to, diethylene glycol monoethyl ether (having a boiling point of 202 ° C.), triethylene glycol monomethyl ether (having a boiling point of 245° C.), tetraethylene glycol monomethyl ether (having a boiling point of 305° C.), and tripropylene glycol monoethyl ether (having a boiling point of 256 ° C.); ethers of dihydric alcohols such as polypropylene glycol; and ethers of trihydric or higher alcohols such as glycerin (having a boiling point of 290° C.) and hexanetriol.

The content of the water-soluble organic solvent is preferably within a range of 20 to 70 mass % with respect to the total mass of the sublimation ink. In a case where the content of the water-soluble organic solvent is 20 mass % or more with respect to the total mass of the sublimation ink, the dispersibility of the sublimation coloring material and the jetting stability of the sublimation ink in an inkjet method are more easily improved. When the content is 70 mass % or less, the drying property of the sublimation ink is less likely to be impaired.

(3.1.1.4) Dispersing Agent

The sublimation ink may contain a dispersant and can be selected according to the type of the sublimation coloring material.

An example of a dispersing agent includes formalin condensate of sodium creosote oil sulfonate, formalin condensate of sodium cresol sulfonate and sodium 2-naphthol-6-sulfonate, formalin condensate of sodium cresol sulfonate, formalin condensate of sodium phenolsulfonate, formalin condensate of sodium β-naphthol sulfonate, formalin condensate comprising sodium β-naphthalene sulfonate and sodium β-naphthol sulfonate, alkylene oxides including ethylene oxide and propylene oxide, fatty alcohol, fatty amine, fatty acid, phenols, alkylatable compounds comprising alkylphenols and carboxylic amines, lignin sulfonic acid salt, sodium paraffin sulfonate, copolymer of alpha-olefin and maleic anhydride, and known comb block polymers.

Examples of the comb-like block polymer include DISPERBYK-190, DISPERBYK-194N, DISPERBYK-2010, DISPERBYK-2015, and BYK-154 ("DISPERBYK" and "BYK" are registered trade names of the company) manufactured by BYK Japan KK.

The content of the dispersant is not particularly limited but is preferably within a range of 20 to 200 mass % with respect to the total mass of the sublimation coloring material. In a case where the content of the dispersant is 20 mass % or more, the dispersibility of the sublimation coloring material is more easily increased, and in a case where the content of the dispersant is 200 mass % or less, a decrease in the jetting stability of the sublimation ink using an inkjet method is easily suppressed.

(3.1.1.5) Other Components

The ink may further contain other components than those described above, as necessary. Examples of other components include a surfactant, a preservative, a pH adjuster, and the like, and the same ones as the surfactant, the preservative, and the pH adjuster in the pretreatment liquid can be used.

(3.1.2) Physical Properties of Sublimation Ink

The viscosity of the sublimation ink at 25° C. is not particularly limited as long as it is such a degree that the ejection stability by an inkjet method becomes satisfactory. The viscosity is preferably within a range of 3 to 20 mPa·s, and more preferably within a range of 4 to 12 mPa·s. In addition, the viscosity of the ink can be measured by an E type viscometer at 25° C.

(3.2) Method For Applying Sublimation Ink

The method for applying the sublimation coloring material is not particularly limited, and may be a sublimation transfer method, a direct method, or other methods. Among these, a sublimation transfer method is preferable.

That is, it is preferable that the step of applying the sublimation coloring material includes transferring a transfer image formed by applying the ink containing the sublimation coloring material onto the transfer medium to the cloth.

(3.2.1) Sublimation Transfer Method

In the sublimation transfer method, a transfer image formed by applying an ink containing a sublimation coloring material (sublimation ink) onto a transfer medium is transferred onto cloth to which an appropriate amount of a pretreatment liquid has been applied, thereby forming an image on the cloth.

The term "image" generally refers to an image obtained by visually fixing an event on a medium, and in the present invention, the image includes an image entirely dyed in one color, a character, a pattern, a picture, and the like.

The image forming method includes a pretreatment liquid applying, a pretreatment liquid drying, and a sublimation coloring material applying in this order. That is, the pretreatment liquid is applied to the cloth by a sublimation transfer method, the cloth is dried, and then the transfer image is transferred to the cloth. The image for transfer may be prepared in parallel with the pretreatment liquid applying and the pretreatment liquid drying, or may be prepared in advance.

In image formation by the sublimation transfer method, first, a sublimation ink is applied onto a transfer medium and then dried to form a transfer image (ink layer) corresponding to an image to be formed on a cloth. The method of applying the sublimation ink is not particularly limited, but an inkjet method is preferably used because an image can be formed with high precision.

The transfer medium used in the image formation by the sublimation transfer method is not particularly limited as long as a transfer image can be formed on the surface of the transfer medium and the transfer image can be transferred to a cloth. Specifically, it is not particularly limited as long as it does not hinder the sublimation of the sublimation coloring material at the time of transfer. As the transfer medium, for example, paper on the surface of which an ink receiving layer is formed by inorganic fine particles such as silica is preferable, and dedicated paper for inkjet and transfer paper are exemplified.

Next, the surface of the transfer image on the transfer medium is brought into contact with the cloth after the pretreatment liquid drying process and heated and pressurized (hot-pressed). As a result, the sublimation coloring material in the transfer image formed on the transfer medium is sublimation-transferred to the cloth to form an image on the cloth.

Conveyance methods for conveying the cloth during heating and pressurizing are roughly classified into a flat type and a continuous type (linear type), depending on the shape of a member that performs heating and pressurizing. A flat, plate-like member is used to perform heating and pressurizing for each certain area. On the other hand, heating and pressurizing are continuously performed using a roll-shaped member in a continuous system.

In the present invention, a conveyance method for conveying the cloth during heating and pressurizing is not particularly limited. In a case where an image is formed on a long cloth, for example, a roll-shaped cloth, a continuous type is preferable from the viewpoint of suppressing dyeing unevenness.

The transfer temperature (heat press temperature) depends on the sublimation temperature of the sublimation coloring material, but is preferably in a range of, for example, 180 to 210° C. The pressing force is preferably within a range of 200 to 500 g/cm$^2$ in the case of the flat type, and within a range of 2 to 6 kg/cm$^2$ in the case of the continuous type. The pressing time depends on the transfer temperature and the pressing pressure but is preferably in a range of 30 seconds to 180 seconds.

(3.2.2) Direct Scheme

After the sublimation coloring material is directly applied to the cloth by the direct method, the cloth is heated to fix the vaporized sublimation coloring material to the cloth, thereby forming an image.

The method of directly applying the sublimation coloring material to the cloth is not particularly limited, and a known method can be used, and examples thereof include a spray method, a mangle method (pad method or dipping method), a coating method, and an inkjet method.

In addition, a method for heating the sublimation coloring material is not particularly limited, known methods can be used, and examples thereof include warm air, an electric heater, and an infrared heater. In addition, the various heaters may have a plate shape or a roller shape.

(4) Conditions For Applying The Organic Solvent Contained In The Pretreatment Liquid From the viewpoint that the dyeing properties for a cloth are high and yellowing during heating and discoloration in a high-humidity environment can be suppressed, it is preferable that the pretreatment liquid contains an organic solvent containing nitrogen or sulfur as a solvent. In addition, it is preferable that the application amount of the organic solvent immediately after the applying of the pretreatment liquid is within a range of 10 to 150 mass % with respect to the mass of the entire cloth, and the residual amount of the organic solvent immediately before the ink containing the sublimation coloring material is transferred to the cloth in the transferring is within a range of 3 to with respect to the mass of the entire cloth.

That is, it is preferable that the conditions for providing an organic solvent be satisfied in each of the steps described above. Each of the of the steps in a case where the conditions for applying the organic solvent are satisfied will be described.

In the present specification, the "mass of the entire cloth" does not mean the mass of the entire cloth to which the pretreatment liquid is applied, for example, the mass of the entire roll in a case where the pretreatment liquid is applied by drawing out the cloth wound in a roll shape. In the present specification, the term "mass of the entire cloth" refers to the mass of the cloth itself per fixed area of a portion of the cloth to which the pretreatment liquid is to be applied. That is, it refers to the mass per unit area of the cloth itself.

Therefore, the application amount of the organic solvent or the like is expressed as a relative value (mass %) of the mass of the organic solvent or the like applied to the unit area with the total mass of the unit area being 100 mass %.

(4.1) Components of Pretreatment Liquid

The pretreatment liquid is a pretreatment liquid used for textile printing by a sublimation transfer method. In the case of a cloth containing hydrophilic fibers such as natural fibers or synthetic cellulose fibers, the pretreatment liquid has a function of swelling the cloth to widen the gaps between the fibers, thereby allowing the sublimation dye to easily enter the fibers. It is preferable that the solvent includes an organic solvent including nitrogen or an organic solvent.

(4.1.1) Solvent

The solvent contained in the pretreatment liquid acts as a carrier of the transferred dye such that the dye easily enters the fiber. In addition, when the solvent contains an organic solvent containing nitrogen or sulfur, the solvent has a function of easily capturing the dye in the sublimation ink between fibers of the cloth appropriately swollen by the pretreatment liquid.

(Organic Solvent Containing Nitrogen or Sulfur)

Examples of nitrogen-containing or sulfur-containing organic solvents include amides such as N-methylformamide, N,N-dimethylformamide, N-methylacetamide, dimethylacetamide, N,N-dimethylacetamide, N-methoxy-N-methylacetamide, N-ethylacetamide, and N,N-diethylacetamide; heterocyclic compounds such as 1,3-dimethyl 2-imidazolidinone, N-methyl 2-pyrrolidinone, 2-pyrrolidone (2-pyrrolidinone), and 1-methyl 2,5-pyrrolidinedione; and sulfoxides such as dimethyl sulfoxide and diethylsulfoxide.

Among these, N-methylacetamide, 1,3-dimethyl-2-imidazolidinone, dimethyl sulfoxide, and 2-pyrrolidone (2-pyrrolidinone) are preferable in that they can swell fibers of a cloth and can dye the cloth at a high concentration because of their high solubility of a dye.

(A Boiling Point of an Organic Solvent and a Temperature in a Step of Drying Cloth)

When the temperature in the step of drying a cloth described later (hereinafter also simply referred to as "drying") is lower than the boiling point of the organic solvent, the organic solvent tends to remain in the cloth in an optimal residual amount.

The temperature in the drying described later is preferably within a range of 100° C. to 200° C., and particularly preferably within a range of 100° C. to 130° C. from the viewpoint of preventing yellowing of the cloth due to drying heat. Therefore, the boiling point of the organic solvent is preferably higher than 130° C. and 260° C. or lower.

Examples of the solvents having a boiling point of higher than 130° C. and 260° C. or lower include N-methylacetamide (165° C.),1,3-dimethyl-2-imidazolidinone (225° C.), dimethyl sulfoxide (189° C.), and 2-pyrrolidone (2-pyrrolidinone) (245° C.).

(Other Organic Solvents)

As the solvent, an organic solvent other than the organic solvent containing nitrogen or sulfur may be contained, and it is preferable to contain a water-soluble organic solvent from the viewpoint of moisture retention, viscosity adjustment, and the like.

In particular, when the pretreatment liquid is applied to the cloth by an inkjet method, the pretreatment liquid preferably further contains a water-soluble organic solvent. As the water-soluble organic solvent, those described above can be used.

The cloth includes a hydrophilic fiber. Therefore, it is preferable to contain a water-soluble organic solvent having a high boiling point such that the pretreatment liquid does not easily thicken due to drying, from the viewpoint of promoting the penetration of the pretreatment liquid into the cloth, and from the viewpoint of not easily impairing the ejection stability in the inkjet method.

The boiling point is preferably 200° C. or higher, and polyols and polyalkylene oxides are preferred.

Examples of the polyols having a boiling point of 200° C. or more include dihydric alcohols such as 1,3 -butanediol (boiling point: 208° C.), 1,6-hexanediol (boiling point: 223° C.) and polypropylene glycol; and trihydric or more alcohols such as glycerin (boiling point: 290° C.) and trimethylolpropane (boiling point: 295° C.).

Examples of the polyalkylene oxides having a boiling point of 200° C. or more include ethers of dihydric alcohols such as diethylene glycol monoethyl ether (boiling point: 202° C.), triethylene glycol monomethyl ether (boiling point: 245° C.), tetraethylene glycol monomethyl ether (boiling point: 305° C.) and tripropylene glycol monoethyl ether (boiling point: 256° C.); and polypropylene glycol; and ethers of trihydric or higher alcohols such as glycerin (boiling point: 290° C.) and hexanetriol.

(4.1.2) The Amount Of The Organic Solvent To Be Applied Immediately After The Step Of Applying The Pretreatment Liquid The amount of the organic solvent applied to the cloth immediately after the step of applying the pretreatment liquid is within a range of 10 to 150 mass % with respect to the mass of the entire cloth.

The application amount is preferably within a range of 5 to 95 mass %, more preferably within a range of to 50 mass % in terms of dyeing density.

Hereinafter, in a case where the sublimation ink contains an organic solvent at the time of producing a transfer medium in the sublimation coloring material applying, it is necessary to particularly distinguish the organic solvent contained in the sublimation ink from the organic solvent contained in the pretreatment liquid. In this case, the organic solvent contained in the pretreatment liquid is referred to as "organic solvent β", and the organic solvent contained in the sublimation ink is referred to as "organic solvent β".

For example, in a case where the pretreatment liquid is applied by an inkjet method, the amount of the organic solvent α applied to the cloth is the application amount itself. When the organic solvent a is applied by the mangle method, the amount of the organic solvent a applied to the cloth is the amount of the organic solvent α contained per unit area of the cloth after the organic solvent is applied to the cloth and then the cloth is squeezed.

When the amount of the organic solvent applied to the cloth is within the above-described range, the cloth swells and the gaps between fibers expand. Therefore, the sublimation dye easily enters the inside of the fiber, and the dyeing density at the time of sublimation ink transfer is increased.

(4.1.3) Other Components

It is preferable that the pretreatment liquid contains an aromatic heterocyclic compound from the viewpoint of easily capturing the dye in the sublimation ink inside the fibers of the cloth and increasing the dyeing density.

In addition to the solvent and the aromatic heterocyclic compound, there may be further contained other components as necessary, and examples thereof include a surfactant, a preservative, a pH adjuster, water, and the like.

(Aromatic Heterocyclic Compound)

It is preferable that the pretreatment liquid contains an aromatic heterocyclic compound from the viewpoint of easily capturing the dye in the sublimation ink inside the fibers of the cloth and increasing the dyeing density.

Note that in the present invention, the "aromatic heterocyclic compound" is a compound having aromaticity which consists of carbon and a hetero atom other than carbon as elements constituting an aromatic ring. The case where the element constituting the aromatic ring is only carbon and a hetero atom constitutes a substituent substituted on the aromatic ring is not included.

The aromatic heterocyclic compound is preferably a compound in which the heteroatom constituting the aromatic ring is selected from oxygen, nitrogen and sulfur atoms, and more preferably a nitrogen-containing heterocyclic compound in which the heteroatom is a nitrogen atom, from the viewpoint of easily capturing the dye in the sublimation ink.

The aromatic heterocyclic compound is contained in an amount preferably in the range of 1 to 30 mass % and more preferably in the range of 10 to 20 mass % with respect to the entire pretreatment liquid from the viewpoint of the dye capturing ability.

The aromatic heterocyclic compound preferably has a low molecular weight in terms of dye capturing in the inside of the fiber of the cloth.

The low molecular weight is, for example, in a range of 200 to 1000.

In addition, the aromatic heterocyclic compound is preferably contained in a range of 1 to 30 mass % with respect to the entire pretreatment liquid from the viewpoint of dye capturing, and more preferably contained in a range of 10 to 20 mass %.

The aromatic heterocyclic compound includes for example, a compound having a pyrazole ring, triazole ring, imidazole ring, triazine ring, pyridine ring, indole ring, quinoline ring, pyrrole ring, a thiophene ring, a thiazole ring, or the like, and particularly preferably at least one selected from a compound having a pyrazole ring, triazole ring and imidazole ring from the viewpoint of supplementing the dye in the sublimation ink.

The aromatic heterocyclic compound preferably has three or more aromatic rings, and more preferably has five or more aromatic rings.

In addition, it is preferable to have a structure in which two aromatic rings are bonded to each other through a single bond as a part or the whole.

When the aromatic heterocyclic compound has such a structure, the aromatic heterocyclic compound has high aromaticity and thus has a strong π-π interaction with a sublimation dye.

As a result, the dye-capturing ability is improved, and the effect of suppressing discoloration and fading can be enhanced.

The aromatic heterocyclic compound preferably has a solubility of 10 mass % or more in a solvent also contained in the pretreatment liquid at 25° C. and 1 atm.

As the solubility in the solvent is higher, the aromatic heterocyclic compound in a dissolved state is more likely to enter the inside of the fiber of the cloth, so that the dye capturing ability is improved, and the effect of suppressing discoloration and fading is enhanced.

Specific examples thereof include the above-described exemplary compounds (1) to (13) represented by the following structural formulae.

Note that the aromatic heterocyclic compound according to the present invention is not limited to these.

(Surfactant)

The kind of the surfactant is not particularly limited, but when an anionic compound is contained in the constituent components of the ink, the ionic property of the surfactant is preferably anionic, nonionic or betaine type.

Specifically, fluorine-based or silicone-based surfactants having a high ability to reduce static surface tension, anionic surfactants such as dioctyl sulfosuccinate and sodium dodecyl sulfate having a high ability to reduce dynamic surface tension, and nonionic surfactants such as polyoxyethylene alkyl ethers having a relatively low molecular weight, polyoxyethylene alkylphenyl ethers, acetylene glycols, Pluronic -type surfactants (Pluronic is a registered trademark), and sorbitan derivatives are preferably used.

In addition, it is also preferable to use a fluorine-based or silicone-based surfactant and a surfactant having a high dynamic surface tension reducing ability in combination.

Preservative

Examples of the preservative include aromatic halogen compounds (e.g., "Preventol CMK"), methylene dithiocyanate, halogen-containing nitrogen-sulfur compounds, and 1,2-benzisothiazolin-3-one (e.g., "PROXELGXL").

pH Adjuster

Examples of the pH adjuster include citric acid, sodium citrate, hydrochloric acid, and sodium hydroxide.

Water

The water is not particularly limited, and may be ion-exchanged water, distilled water, or pure water.

The content of water in the pretreatment liquid is preferably in the range of 0 to 95 mass %, more preferably in the range of 0 to 50 mass %.

(4.1.4) Physical Properties of Pretreatment Liquid

The viscosity of the pretreatment liquid at 25° C. can be appropriately adjusted depending on the method of applying the pretreatment liquid to the cloth.

For example, in a case where the pretreatment liquid is applied by an inkjet method, the viscosity of the pretreatment liquid is preferably in a range of 4 to 20 mPa·s.

In addition, the viscosity of the pretreatment liquid can be measured by an E type viscometer at 25° C.

(4.2) Pretreatment Liquid Drying

This is as described above in the "pretreatment liquid drying".

In the step of drying the cloth (drying), after the pretreatment liquid is applied to the cloth as described above, the coating film of the pretreatment liquid applied to the cloth is dried to remove an excess liquid medium (which refers to an organic solvent and water).

Thereafter, an ink containing a sublimation coloring material (sublimation ink) is transferred onto the cloth. In the process of transferring the sublimation ink, it is preferable that a residual amount of the organic solvent immediately before the sublimation ink is transferred to the cloth is controlled in the drying so as to be in a range of 3 to 40 mass % with respect to the mass of the entire cloth.

As described above, when the organic solvent contained in the pretreatment liquid is referred to as "organic solvent α" and the organic solvent contained in the sublimation ink is referred to as "organic solvent β", the organic solvent α and the organic solvent β may be the same.

Further, in the present specification, "the residual amount of the organic solvent immediately before the sublimation ink transfer to the cloth" refers to "the residual amount of the organic solvent α immediately before the sublimation ink transfer to the cloth".

Provided that the "residual amount of the organic solvent immediately before the sublimation ink is transferred to the cloth" does not include the amount of the organic solvent β contained in the sublimation ink when a transfer medium is produced in the sublimation coloring material applying.

(4.3) A Sublimation Coloring Material Applying

This is as described in the "sublimation coloring material applying".

After the pretreatment liquid is applied to the cloth containing the pretreatment liquid as described above, excess pretreatment liquid is further removed in the pretreatment liquid drying. Thus, the effect of suppressing the yellowing of a white background portion of a transfer image and the discoloration of the sublimation ink under a high-humidity environment can be obtained.

In order to obtain the above-described effects, it is preferable that the amount of the pretreatment liquid in the pretreatment liquid drying is controlled such that the residual amount of the organic solvent on the cloth immediately before the sublimation ink transfer in the transferring is in a range of 3 to 40 mass % with respect to the mass of the entire cloth.

Note that the aforementioned "residual amount of the organic solvent immediately before the sublimation ink transfer to the cloth" refers to a residual amount of the organic solvent α immediately after the pretreatment liquid drying.

3 Image Forming Apparatus

According to an aspect of the invention, there is provided an image forming apparatus that forms an image on a cloth with a sublimation coloring material, the image forming apparatus including: a pretreatment liquid applying unit that applies a pretreatment liquid to the cloth; a drying unit that dries the cloth; and a sublimation coloring material applying unit that applies the sublimation coloring material to the cloth, wherein a heat source and the cloth are not in contact with each other in the drying unit.

As described above, the method of applying the sublimation coloring material is not particularly limited, and may be a sublimation transfer method, a direct method, or other methods. Among these, a sublimation transfer method is preferable.

That is, it is preferable that the sublimation coloring material applying unit that applies the sublimation coloring material has a transfer unit that transfers the transfer image formed by applying the ink containing the sublimation coloring material onto the transfer medium to the cloth.

(1) Sublimation Transfer Method

FIG. 1 is a schematic diagram of an image forming apparatus (sublimation transfer method, continuous type) of the present invention. FIG. 1 illustrates an example in which all of the pretreatment liquid applying unit that applies the pretreatment liquid to the cloth, the drying unit that dries the cloth, and the sublimation coloring material applying unit that applies the sublimation coloring material to the cloth are mounted in one apparatus. The configuration of the image forming apparatus of the present invention is not limited thereto, and for example, each unit may be provided as a separate apparatus.

In addition, the drying unit that dries the cloth is not particularly limited as long as the heat source and the cloth are not in contact with each other. From the viewpoint of improving the dyeing density and reducing uneven dyeing, it is preferable to dry the cloth by circulating warm air, and for example, a pretreatment liquid drying section illustrated in FIG. 3 is more preferable.

The image forming apparatus 400 illustrated in FIG. 1 includes a pretreatment liquid applying section 103 as a pretreatment liquid applying unit which applies a pretreatment liquid to a cloth, a pretreatment liquid drying section 104 as a drying unit which dries a cloth, an inkjet recording section 203 as a sublimation coloring material applying unit which applies a sublimation coloring material to a cloth, an ink drying section 204, and a transfer section 301. Furthermore, as illustrated in FIG. 1, for example, a peeling section 302, a cloth conveyance section 102, a transfer medium conveyance section 202, and other components or devices may be included as necessary.

Hereinafter, the image forming apparatus 400 shown in FIG. 1 will be described in detail.

Figure 4:
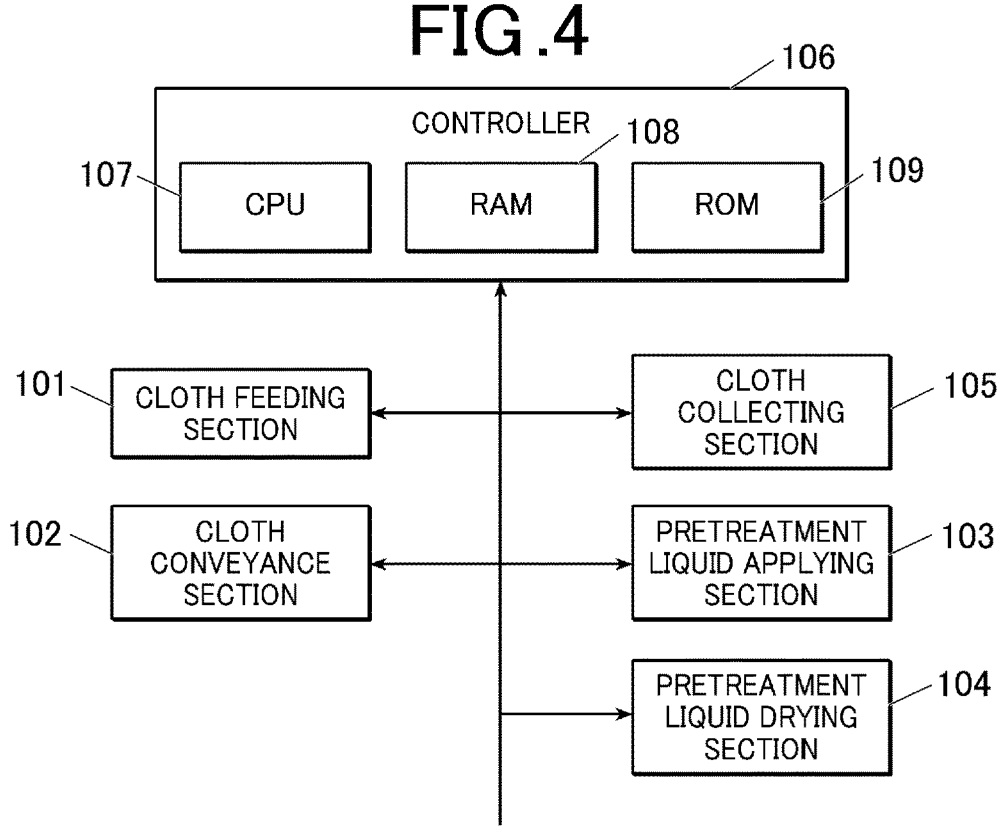
FIG. 4 is a block diagram illustrating a configuration for controlling application conditions of a pretreatment liquid based on cloth information.

The image forming apparatus 400 conveys the cloth C from the cloth feeding section 101 to the pretreatment liquid applying section 103 under the control of the controller 106 shown in FIG. 4, and applies the pretreatment liquid to the cloth in the pretreatment liquid applying section 103. The cloth C1 to which an appropriate amount or more of the pretreatment liquid has been applied is further conveyed to the pretreatment liquid drying section 104, and the cloth is dried in the pretreatment liquid drying section 104. The cloth C2 to which an appropriate amount of the pretreatment liquid has been applied is conveyed to the transfer section 301. Next, in the transfer section 301, the cloth C2 to which the appropriate amount of the pretreatment liquid has been applied and the transfer medium P2 on which the transfer image has been formed are heated and pressurized to perform sublimation transfer. Thereafter, the cloth N on which the image is formed and the transfer medium P3 after the heating and the pressurizing are separated from each other in a peeling section 302, and the cloth N on which the image is formed is collected in a cloth collecting section 105.

The cloth C is installed in a cloth feeding section 101 provided on the upstream side of the pretreatment liquid applying section 103 in the conveyance direction. The cloth feeding section 101 includes a rotation shaft to which the cloth C in a roll form is attached, a motor (not illustrated) that rotationally drives the rotation shaft in a predetermined rotation direction, and the like. The cloth feeding section 101 feeds the cloth C to the downstream side in the conveyance direction along with the rotation of the rotation shaft by driving the motor.

The cloth conveyance section 102 conveys the cloth C fed from the cloth feeding section 101. In FIG. 1, a configuration is adopted in which the cloth C is conveyed by a conveyance roller, but a configuration may be adopted in which the cloth C is conveyed by being stuck to a conveyance belt, for example.

The cloth collecting section 105 is provided on the downstream side of the peeling section 302, and collects the cloth N on which an image is formed while winding the cloth N.

FIG. 4 is a block diagram illustrating a configuration for controlling application conditions of a pretreatment liquid based on cloth information.

The controller 106 controls the conditions for applying the pretreatment liquid based on the cloth information. Specifically, it is preferable to control the application amount of the pretreatment liquid based on the cloth information.

Cloth information (e.g., a fiber ratio, a weight per unit area, a fiber type, and the like of the cloth) input when a user operates an operation part (not shown) is input to the controller 106.

The controller 106 includes CPU 107, RAM 108, ROM 109, and the like. The CPU 107 reads various programs, data, and the like corresponding to processing content from a storage device such as the ROM 109 and executes the programs. The operation of each section of the image forming apparatus 400 is controlled according to the executed processing content. RAM 108 temporarily stores various programs, data, and the like processed by CPU 107. The ROM 109 stores various programs read by the CPU 107, data, and the like.

More specifically, the controller 106 performs the following processing on the image forming apparatus 400.

The controller 106 applies the pretreatment liquid to the cloth C by operating the pretreatment liquid applying section 103 so that the application amount of the pretreatment liquid becomes a predetermined amount according to the cloth information input from the operation part (not illustrated). As the cloth information, for example, it is preferable to control the application amount of the pretreatment liquid according to the fiber ratio (specifically, polyester fiber ratio) of the cloth C.

In addition, ROM 109 stores data of the application amount of the pretreatment liquid corresponding to the fiber ratio of the cloth C, for example. The application amount data of the pretreatment liquid is preferably data calculated from a mathematical expression based on the fiber ratio or data on an application amount based on a threshold value of the fiber ratio.

Examples of the formula include, but are not limited to, those represented by the following formulae.

$$y=-ax+100a \quad \text{(expression)}$$

In the above expression, y represents an application amount [g/m$^2$] X represents a polyester fiber ratio (0 to 100 mass %), and a represents a gradient (e.g., a=0.4 [g/m$^2$])

As for the data on an application amount based on a threshold value of the fiber ratio, for example, when the polyester fiber ratio in the cloth is 0 mass % or more and less than 40 mass %, the application amount is set to 40 g/m$^2$, and when the polyester fiber ratio is 40 mass % or more and less than 80 mass %, the application amount is set to 20 g/m$^2$.

In addition, it is preferable that the data of the application amount based on the mathematical expression, or the threshold value is corrected by, for example, weight per unit area.

Specifically, it is desirable to increase the application amount as the weight per unit area increases.

Image forming apparatus 400 conveys transfer medium P from transfer medium feeding section 201 to inkjet recording section 203 and applies sublimation ink to the transfer medium in inkjet recording section 203. The transfer medium P1 with the sublimation ink applied thereto is further conveyed to the ink drying section 204, and the cloth is dried in the ink drying section 204. Transfer medium P2 on which the transfer image is formed is conveyed to transfer section 301. Next, in the transfer section 301, the cloth C2 to which the appropriate amount of the pretreatment liquid has been applied and the transfer medium P2 on which the transfer image has been formed are heated and pressurized to perform sublimation transfer. Thereafter, the cloth N on which the image is formed and the transfer medium P3 after being heated and pressed are peeled off from each other in the peeling section 302, and the transfer medium P3 after being heated and pressed is collected in the transfer medium collecting section 205.

A roll-shaped transfer medium P is mounted on the transfer medium feeding section 201. The transfer medium P is fed out by driving a motor (not shown). At this time, the transfer medium P is attached so that the transfer surface (e.g., the surface on which the ink receiving layer is formed) faces the inkjet head of the inkjet recording section 203.

Inkjet recording section 203 applies sublimation ink, using an inkjet head, onto transfer medium P fed from transfer medium feeding section 201.

The ink drying section 204 is provided on the downstream side of the inkjet recording section 203 and dries the transfer medium P1 to which the sublimation ink has been applied.

The transfer section 301 preferably includes, for example, a heating roller 301*a* having a heat source therein and a pressure roller 301*b* made to pressed contact with the heating roller 301*a*. By adopting such a configuration, sublimation transfer can be performed by continuously applying heat and pressure.

Figure 5:
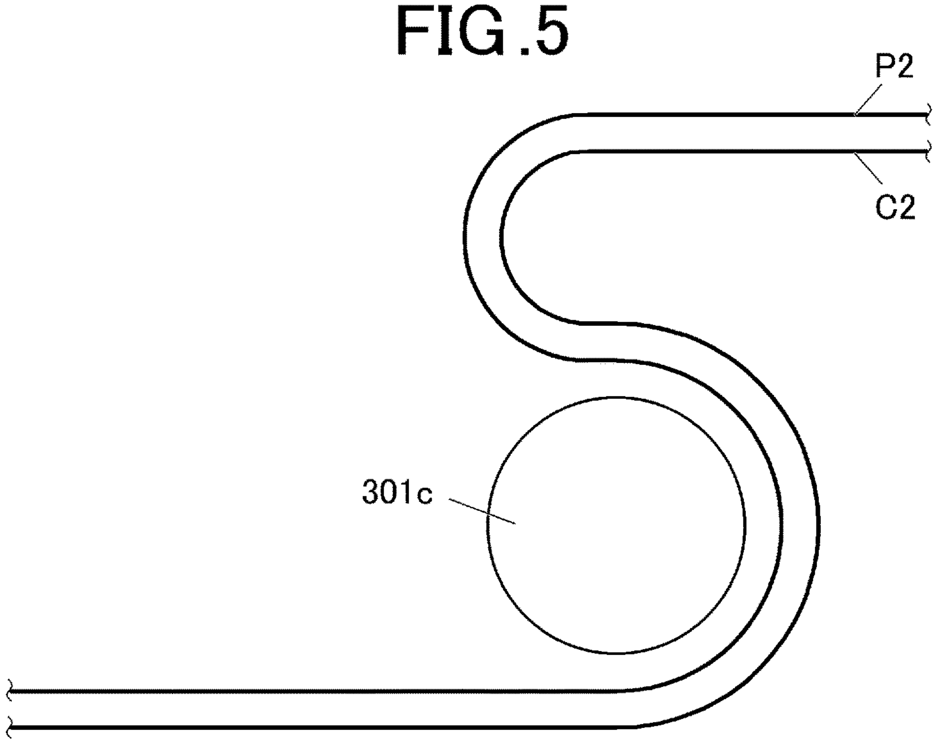
FIG. 5 is a schematic diagram of a heating roller in a sublimation transfer method.

Note that as illustrated in FIG. 1, the transfer section 301 may have a configuration in which the cloth C2 to which an appropriate amount of the pretreatment liquid has been applied and the transfer medium P2 on which the transfer image has been formed are sandwiched between a heating roller 301*a* and a pressure roller 301*b*. As illustrated in the schematic diagram of the heating roller in the sublimation transfer method of FIG. 5, a configuration may be adopted in which the cloth C2 provided with an appropriate amount of a pretreatment liquid and the transfer medium P2 on which a transfer image is formed are wound around the heating roller 301*c*.

Cloth C2 provided with an appropriate amount of the pretreatment liquid and the transfer medium P2 on which the transfer image is formed are passed through the nip part between the heating roller 301*a* and the pressure roller 301*b* in a state of being superimposed (laminated body) so as to be in contact with each other at the transfer surface (the surface on which the transfer image is formed). Thus, a laminate of the cloth C2 provided with an appropriate amount of the pretreatment liquid and the transfer medium P2 on which the transfer image is formed is subjected to heating and pressurizing treatment. Then, the transfer image on the transfer medium P2 is sublimated and transferred to the cloth C2 to which an appropriate amount of the pretreatment liquid is applied, and the cloth C2 becomes the cloth N on which the image is formed.

The peeling section 302 is provided on a downstream side of the transfer section 301. The peeling section 302 releases the transfer medium P3 after heating and pressurizing from the laminate after heating and pressurizing to obtain a cloth N on which an image is formed.

The transfer medium collecting section 205 is provided on the downstream side of the peeling section 302. The used transfer medium P3 after heating and pressurizing, which has been peeled off from the laminate in the peeling section 302, is collected while being wound up.

(2) Direct Scheme

FIG. 2 is a schematic view of an image forming apparatus (direct system) according the present invention. FIG. 2 illustrates an example in which the pretreatment liquid applying unit that applies the pretreatment liquid to the cloth, the drying unit that dries the cloth, and the sublimation coloring material applying unit that applies the sublimation coloring material to the cloth are all mounted in one apparatus, but the configuration of the image forming apparatus of the present invention is not limited thereto, and for example, each of the units may be provided in a separate apparatus.

In addition, the drying unit that dries the cloth is not particularly limited as long as the heat source and the cloth are not in contact with each other. From the viewpoint of improving the dyeing density and reducing uneven dyeing, it is preferable to dry the cloth by circulating warm air, and for example, a pretreatment liquid drying section illustrated in FIG. 3 is more preferable.

The image forming apparatus 600 illustrated in FIG. 2 includes a pretreatment liquid applying section 103 as a pretreatment liquid applying unit that applies the pretreatment liquid to the cloth, a pretreatment liquid drying section 104 as a drying unit that dries the cloth, and an inkjet recording section 501 and an ink heating section 502 as sublimation coloring material applying unit that apply the sublimation coloring material to the cloth. In addition, as shown in FIG. 2, other components or devices such as a cloth conveyance section 102 may be provided as necessary.

Examples of the heat source used for the ink heating section 502 include an electric heater and an infrared heater. The shape of the substrate is not particularly limited and may be a plate shape or a roll shape.

4. Image Forming System

The image forming system of the present invention is an image forming system for dyeing a cloth comprising natural fibers by a sublimation transfer method. The image forming system includes: a pretreatment liquid applying unit that applies a pretreatment liquid to be cloth; a drying unit that dries the cloth; and a sublimation ink applying unit that applies a sublimation ink to a transfer medium, and a transfer unit that transfers the sublimation ink from the transfer medium. In the drying unit that dries the cloth, a heat source is not in contact with the cloth. The pretreatment liquid contains an organic solvent containing nitrogen or sulfur as a solvent. The application amount of the organic solvent immediately after the pretreatment liquid applying unit that applies the pretreatment liquid is within a range of 10 to 150 mass % with respect to the mass of the entire cloth. In addition, the residual amount of the organic solvent immediately before the sublimation ink is transferred to the cloth in the transfer unit is in a range of 3 to 40 mass % with respect to the mass of the entire cloth.

The above-mentioned image forming method is suitably used for the image forming system.

Figure 6:
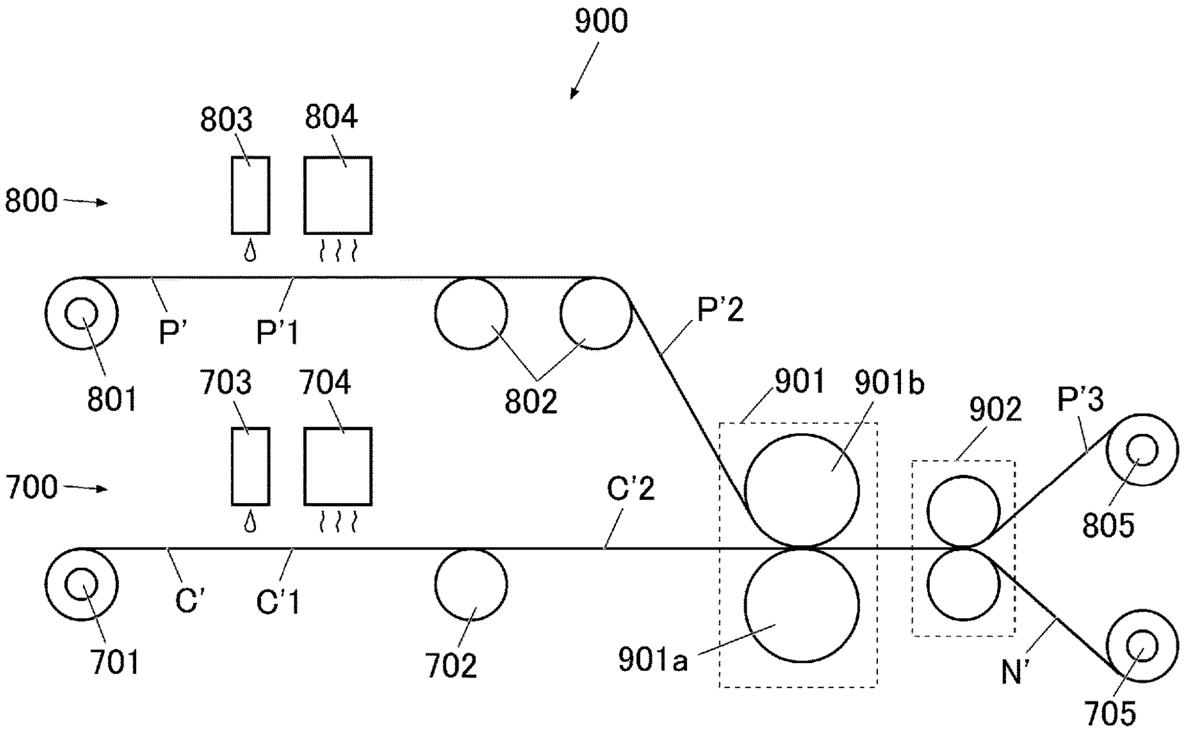
FIG. 6 is a schematic diagram illustrating an example of an image recording system of the present invention.

FIG. 6 is a schematic diagram illustrating an example of the image recording system of the present invention.

The image recording system (900) shown in FIG. 6 is an image recording system for printing a cloth by a continuous transfer printing method.

FIG. 6 is an example of the image recording system (900) of the present invention, and the present invention is not limited to this configuration.

The image recording system (900) includes a pretreatment liquid applying device (700) and a sublimation ink applying device (800), and further includes a transfer section (901), a peeling section (902), a transfer medium collecting section (805), a cloth collecting section (705), and a controller (706).

(1) Pretreatment Liquid Applying Unit

As a pretreatment liquid applying unit that applies the pretreatment liquid , for example, the following pretreatment liquid applying device can be used.

Figure 7:
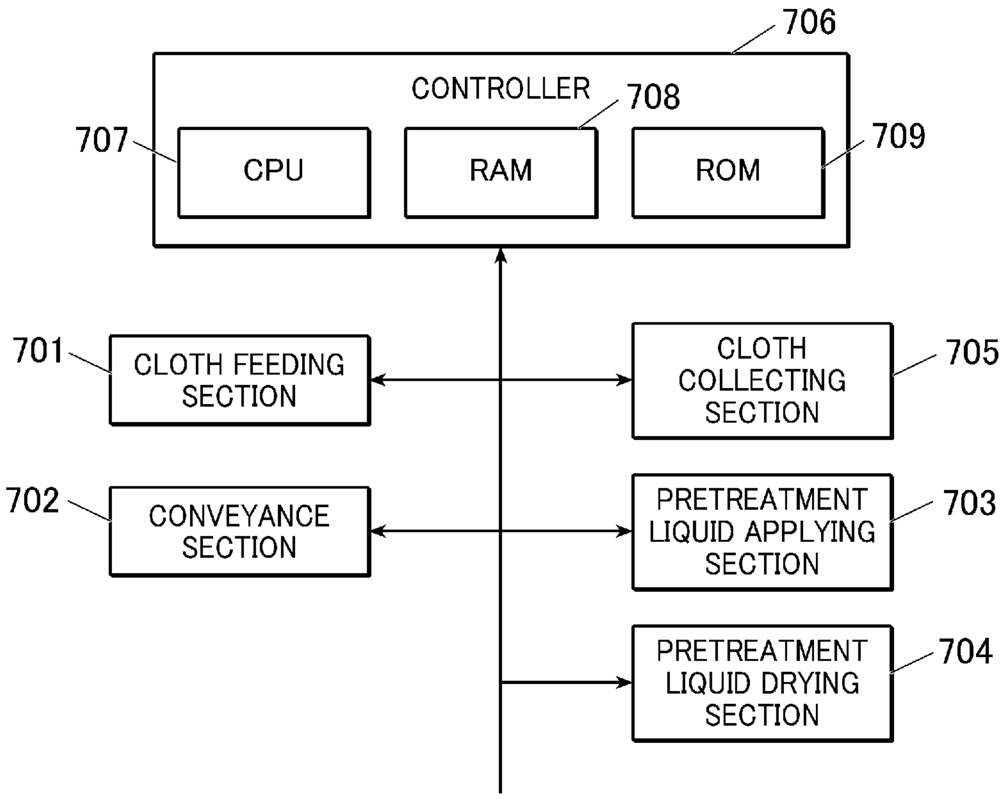
FIG. 7 is a block diagram illustrating an internal configuration of a pretreatment liquid applying device.

FIG. 7 is a block diagram illustrating an internal configuration of the pretreatment liquid applying device (700) according to the present invention.

Pretreatment Liquid Applying Device

The pretreatment liquid applying device (700) comprises a cloth feeding section (701), a conveyance section (702), a pretreatment liquid applying section (703), a pretreatment liquid drying section (704), a cloth collecting section (705), a controller (706), and the like.

The pretreatment liquid applying device (700) conveys the cloth (C') from the cloth feeding section (701) to the pretreatment liquid applying section (703) under the control of the controller (706). A pretreatment liquid is applied to the cloth (C') in the pretreatment liquid applying section (703), and the cloth to which the pretreatment liquid has been applied (hereinafter referred to simply as "cloth (C1)") is dried in the drying section (704). A cloth (C'2) (hereinafter, also simply referred to as "cloth (C'2)") from which the excessive pretreatment liquid is removed is prepared. The cloth (C'2) is conveyed to a cloth collecting section (705) provided on the downstream side of the peeling section (902).

Then, the cloth (N') to which the image for transfer peeled off in the peeling section (902) has been thermally transferred (hereinafter, also simply referred to as a "cloth (N')") is collected while being wound.

Pretreatment Liquid Applying Section

The pretreatment liquid applied by the pretreatment liquid applying section (703) contains an organic solvent containing nitrogen or sulfur as a solvent. An application amount of the organic solvent immediately after the pretreatment liquid applying unit that applies the pretreatment liquid is adjusted to be within a range of 10 to 150 mass % with respect to the mass of the entire cloth.

The components and the like contained in the pretreatment liquid are as described above.

Thereafter, as described later, in the sublimation ink applying device (800), the image for transfer recorded on a transfer medium is transferred to the surface of the cloth (C'2) on which the pretreatment liquid has been applied (see FIG. 6).

Pretreatment Liquid Application Method

An application method in the pretreatment liquid applying section (703) is not particularly limited, and may be any one of a spray method, a mangle method (pad method), a coating method, and an inkjet method.

For example, an inkjet method is preferable from the viewpoint of continuously performing the step of applying the sublimation ink in a sublimation ink applying device (800) described later, and a mangle method or a coater method is preferable from the viewpoint of applying a predetermined amount of the pretreatment liquid in a short time.

In the mangle method, the cloth is immersed in the pretreatment liquid stored in a bath, and then squeezed to adjust the application amount of the pretreatment liquid.

The temperature of the pretreatment liquid is not particularly limited, but is preferably within a range of 15 to 30° C.

Controller

The controller (706) controls the application conditions of the pretreatment liquid based on the cloth information.

Specifically, it is preferable to control the application amount of the pretreatment liquid on the basis of cloth information (e.g., the fiber ratio, weight per unit area, fiber type, and the like of the cloth).

Cloth information input when a user operates an operation part (not shown) is input to the controller (706).

Furthermore, the controller (706) includes CPU (707), RAM (708), and ROM (709). The CPU (707) reads various programs, data, and the like corresponding to processing content from a storage device such as the ROM (709) and executes them, and controls operation of various components of the pretreatment liquid applying device (700) in accordance with the processing content that has been executed.

The RAM (708) temporarily stores various programs to be processed by the CPU (707), data, and the like.

The ROM (709) stores various programs, data, and the like read by the CPU (707) and the like.

Specifically, the controller (706) performs the following treatment on the pretreatment liquid applying device (700).

That is, the controller (706) operates the pretreatment liquid applying section (703) so that the application amount of the pretreatment liquid becomes a predetermined amount according to the cloth information input from the operation part (not illustrated) and applies the pretreatment liquid to the cloth (C').

Cloth Feeding Section

The cloth (C') is installed in the cloth feeding section (701) provided on the upstream side of the pretreatment liquid applying section (703) in the conveyance direction.

The cloth feeding section (701) includes a rotation shaft on which the cloth (C') in a roll form is mounted, a motor (not illustrated) that rotationally drives the rotation shaft in a predetermined rotation direction, and the like.

The cloth feeding section (701) feeds the cloth (C') to the downstream side in the conveyance direction along with the rotation of the rotary shaft by driving the motor.

Conveyance Section

The conveyance section (702) conveys the cloth (C') fed from the cloth feeding section (701).

In FIG. 6, the cloth (C') is conveyed by a conveyance roller, but for example, the cloth (C') may be attached to a conveyance belt and conveyed.

(2) Drying Unit That Dries Cloths

Pretreatment Liquid Drying Section

The pretreatment liquid drying section (704) dries the cloth (C'1) to which the pretreatment liquid has been applied by the pretreatment liquid applying section (703) and removes excess pretreatment liquid from the cloth (C'1).

The drying unit is not particularly limited as long as a heat source and the cloth are not in contact with each other.

The temperature in the drying unit that dries the cloth (C'1) to which the pretreatment liquid has been applied (hereinafter also referred to as the "drying temperature") is preferably within a range of 100 to 200° C., and particularly preferably within a range of 100 to 130° C. from the viewpoint of preventing yellowing due to the drying heat of the cloth.

The drying temperature is preferably lower than the boiling point of the organic solvent from the viewpoint of allowing the organic solvent to easily remain in the cloth at a residual amount within an optimum range. Further, it is preferable that the drying temperature be lower than the heating temperature at the time of transfer from the viewpoint of suppressing discoloration of a cloth white background portion due to heating.

Cloth Collecting Section

The cloth collecting section (705) is provided on the downstream side of the pretreatment liquid drying section (704). In the pretreatment liquid drying section (704), the image for transfer formed on the transfer medium by the transfer section (901) is thermally transferred to the cloth (C'2). The cloth (N') is collected while being wound.

(3) A Sublimation Ink Applying Unit That Applies A Sublimation Ink to a Transfer Medium The sublimation ink applying device (800) forms a transfer image (ink layer) by applying the sublimation ink to the transfer medium by the inkjet recording section (803). In the pretreatment liquid drying section (704), the image for transfer formed on the transfer medium by the transfer section (901) is thermally transferred to the cloth (C'2). The used transfer paper base material (P'3) is collected by the transfer medium collecting section (805).

Specifically, there are provided a transfer medium feeding section (801), an inkjet recording section (803), an ink drying section (804), a transfer section (901), and a transfer medium collecting section (805).

Furthermore, it is preferable to include a peeling section (902) and a conveyance section (802) that conveys the transfer medium.

The transfer-medium feeding section (801) includes a roll-shaped transfer paper base material (P') as a transfer medium.

When the transfer paper base material (P') is fed out by driving a motor (not shown), a transfer surface of the transfer paper base material (P') is attached so as to face the inkjet head of the inkjet recording section (803).

Inkjet recording section (803) forms an image for transfer (ink image), using an inkjet head, on transfer paper base material (P') fed from transfer medium feeding section (801). Thus, a transfer paper (P'1) (hereinafter, also simply referred to as a "transfer paper (P'1)") on which an image for transfer has been formed is formed.

The ink drying section (804) is provided on the downstream side of the inkjet recording section (803). The transfer paper (P'1) is dried at a temperature lower than the crosslinking temperature of a fixing resin contained in an image (ink image) for transfer.

(4) A Transfer Unit That Transfers The Sublimation Ink From a Transfer Medium

The transfer section (901) preferably includes, for example, a heating roller (901*a*) having an internal heat source and a pressure roller (901*b*) to be pressed contact with the heating roller (901*a*).

The transfer paper (P'1) to which the sublimation ink has been applied is dried by the ink drying section (804) (hereinafter, the dried transfer paper is also referred to as "transfer paper (P'2)"). By the pretreatment liquid applying device (700), the transfer paper (P'2) passes through the nip portion between the heating roller (901*a*) and the pressure roller (901*b*) in a state where the transfer paper (P'2) is stacked with the image surface (the surface on which the image for transfer is formed) facing the cloth (C'2). Thus, heating and pressurizing processes are performed, and the sublimation ink is transferred from the transfer paper (P'2) to the cloth (C'2). Then, a cloth (N'), which is a transfer image formed object to which the transfer image has been thermally transferred, is formed.

At this time, the residual amount of the organic solvent on the cloth (C'2) immediately before the sublimation ink transfer is adjusted to be in a range of 3 to 40 mass % with respect to the mass of the entire cloth (C'2) by the above-described drying.

As described above, the "residual amount of the organic solvent immediately before the sublimation ink transfer" refers to the residual amount of the organic solvent α used in the pretreatment liquid applying.

Furthermore, the organic solvent a and the organic solvent β may be of the same type.

However, the "residual amount of the organic solvent immediately before the sublimation ink transfer to the cloth" does not include the amount of the organic solvent β contained in the sublimation ink in a case where the transfer medium is produced in the sublimation ink applying described above.

The peeling section (902) is provided on the downstream side of the transfer section (901).

The peeling section (902) peels the used transfer paper base material (P'3) after the transfer processing is performed in the transfer section (901).

The transfer medium collecting section (805) is provided on the downstream side of the peeling section (902).

Next, the used transfer paper base material (P'3) peeled from the laminate in the peeling section (902) is collected while being rewound.

The image recording system (900) shown in FIG. 6 feeds out the cloth (C') and applies the pretreatment liquid. On the other hand, the transfer paper base material (P') is fed, an image for transfer is formed, and the transfer paper (P'2) dried by the ink drying section (804) is obtained. Thereafter, the cloth (C'2) from which the excessive pretreatment liquid is removed and the transfer paper (P'2) are superposed to form a laminate, and then an image for transfer is transferred onto the cloth (C'2) by a transfer section (901). Then, the transfer paper (P'2) is peeled from the cloth (C'2) in a continuous system. A batch-type system may be used in which a laminate of the transfer paper (P'2) and the cloth (C'2) is pressed from above and below.

Although embodiments of the present invention have been described and illustrated in detail, the disclosed embodiments are made for purposes of illustration and example only and not limitation. The scope of the present invention should be interpreted by terms of the appended claims

EXAMPLE

Hereinafter, the present invention will be specifically described with reference to Examples, but the present invention is not limited thereto. In Examples, "part (s)" or "%" means "part (s) by mass" or "mass %" unless otherwise specified.

In the following examples, the operation was performed at room temperature (25° C.) unless otherwise noted.

Example [1]

Preparation of Pretreatment Liquid 1

The following components were stirred and mixed to prepare a pretreatment liquid 1.

Dimethyl sulfoxide (I/O value: 1.75) 10 parts by mass

Ion-exchanged water 90 parts by mass

Note that the I/O value of dimethyl sulfoxide was calculated by the above method.

Preparation of Pretreatment Liquids 2 to 5, 7, and 8

Pretreatment liquids 2 to 5, 7, and 8 were prepared in the same manner as for the pretreatment liquid 1, except for the change to the organic compounds listed in Table 1.

The I/O value of the organic compound was calculated by the method described above.

Preparation of Pretreatment Liquid 6

The following components were stirred and mixed to prepare a pretreatment liquid 6.

| | |
|---|---|
| Dimethyl sulfoxide (I/O value: 1.75) | 80 parts by mass |
| coloring material capturing compound 1 | 10 parts by mass |
| Ion-exchanged water | 10 parts by mass |

Note that as the coloring material capturing compound 1, a compound represented by the following general formula (2) was used.

Also, the Rf value as determined by a paper chromatography method was less than 1. The sublimation coloring material used for obtaining the Rf value was C.I.DisperseRed60.

General Formula (2)

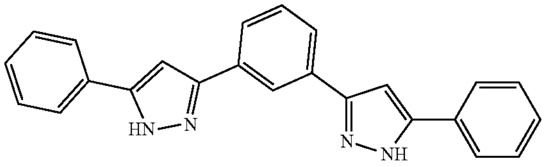

Table I shows the composition of each pretreatment liquid. All the numerical values in Table I indicate the content, and the unit is [parts by mass]. In addition, "-" indicates that no component is contained.

TABLE 1

TABLE I

| PRETREATMENT LIQUID No. | | 1 | 2 | 3 | 4 |
|---|---|---|---|---|---|
| ORGANIC COMPOUND [PARTS BY MASS] | DIMETHYL SULFOXIDE (I/O VALUE: 1.75) | 10 | 35 | 50 | 80 |
| | POLYETHYLENE GLYCOL (I/O VALUE: 2.00) | — | — | — | — |
| | ETHYLENE GLYCOL (I/O VALUE: 5.00) | — | — | — | — |

TABLE 1-continued

TABLE I

| | | | | | |
|---|---|---|---|---|---|
| COLORING MATERIAL CAPTURING COMPOUND 1 [PARTS BY MASS] | | — | — | — | — |
| ION-EXCHANGED WATER [PARTS BY MASS] | | 90 | 65 | 50 | 20 |
| TOTAL [PARTS BY MASS] | | 100 | 100 | 100 | 100 |
| PRETREATMENT LIQUID No. | | 5 | 6 | 7 | 8 |
| ORGANIC COMPOUND [PARTS BY MASS] | DIMETHYL SULFOXIDE (I/O VALUE: 1.75) | 100 | 80 | — | — |
| | POLYETHYLENE GLYCOL (I/O VALUE: 2.00) | — | — | 80 | — |
| | ETHYLENE GLYCOL (I/O VALUE: 5.00) | — | — | — | 80 |
| COLORING MATERIAL CAPTURING COMPOUND 1 [PARTS BY MASS] | | — | 10 | — | — |
| ION-EXCHANGED WATER [PARTS BY MASS] | | — | 10 | 20 | 20 |
| TOTAL [PARTS BY MASS] | | 100 | 100 | 100 | 100 |

Image Formation

(1) A Pretreatment Liquid Applying

Each of the obtained pretreatment liquids was applied to the cloth described in Table II in the main scan 540 dpi× sub-scan 720 dpi using an inkjet printer having an inkjet head (Konica Minolta, Inc. head KM1024iMAE). The application region was a 200 mm×200 mm, and the application amount was 40 $g/m^2$. p Note that details of the type of cloth used are as follows.

Cotton Broad: A broad cloth of cotton.

Rayon: a regenerated fiber produced by dissolving a natural fiber such as wood or cotton containing cellulose once by a chemical reaction and spinning again.

T/C Broad: a blended broad cloth of Tetron® and cotton. Tetoron® is a kind of polyester.

Silk Satin: silk satin cloth.

Nylon Taffeta: A nylon taffeta cloth.

Polyester Decyne: polyester decyne cloth.

(2) Pretreatment Liquid Drying

The cloth provided with the pretreatment liquid was dried at 130° C. for 1 minute by the method described in Table II.

In the drying method described in Table II, "non-contact type" means drying by a non-contact type dryer, and "contact type" means drying by a flat hot press machine.

(3) Transferring

The cloth after the pretreatment liquid drying and the roll transfer paper to which the black sublimation ink had been applied in advance were superimposed on each other so that the cloth and the black sublimation ink were in contact with each other. They were heated and pressed with a transfer device at 180° C. for 3 minutes under a pressing force of 300 $g/cm^2$. As a result, the sublimation ink on the transfer paper was sublimation-transferred to the cloth to form a solid image of a 200 mm×200 mm (flat type) or a solid image of a 120 cm width (continuous type) on the cloth.

Regarding the conveyance method described in Table II, "flat type" means transfer by a flat sublimation transfer press, and "continuous type" means transfer by a continuous sublimation transfer press having a heating roller.

Evaluation

(1) Dyeing Density

For the color density (dyeing density) of the solid image formed on each cloth, the reflectivity Ra, at the 600 nm of each cloth was measured using a spectral colorimeter "CM-25d" (manufactured by Konica Minolta, Inc) under the conditions of a D65 illuminant, a viewing angle of 2 °, and Status I, and the K/S value was calculated. The K/S value is an index of the surface color density defined by the following equation. A larger K/S value means a higher color density, and a smaller K/S value means a lower color density.

$$K/S=(1-R_{\lambda})^2/2R_{\lambda} \text{ (Kubelka-Munk Expression).} \quad \text{(Expression)}$$

(K: an absorption coefficient of light, S: A scattering coefficient of light, $R_{\lambda}$: surface reflectance)

The K/S value was calculated at 5 points in the solid image of the 200 mm×200 mm formed on each cloth. Five points in the solid image were as follows.

(flat type: in the case of a solid image of a 200 mm×200 mm)

: five points in total including a center point which is an intersection of diagonal lines in the solid image and middle points between the four corners and the center point (continuous type: in the case of a solid image with a 120 cm width)

total of five points of 20 cm, 40 cm, 60 cm, 80 cm, and 100 cm from the end in the widthwise direction of the solid image The arithmetic mean value of each K/S value was evaluated according to the following criteria, and 3 or more was regarded as acceptable.

5: The K/S value is more than 17.
4: The K/S value is more than 12 and 17 or less.
3: The K/S value is more than 7 and 12 or less.
2: The K/S value is more than 5 and 7 or less.
1: The K/S value is 5 or less.

(2) Dyeing Unevenness

The dyeing unevenness in the solid image formed on each cloth was evaluated according to the following criteria, and 3 or more was regarded as pass.

5: No uneven dyeing is visually observed, which is not a problem in practical use.
4: Almost no dyeing unevenness was visually observed, and there was no problem in practical use.
3: Slight uneven dyeing is visually observed, but there is no problem in practical use.
2: Dyeing unevenness was visually observed, and it was difficult to put into practical use.
1: Noticeable uneven dyeing is visually observed, which is difficult to use in practice.

The evaluation results are shown in Table II below.

Note that "-" indicates that there is no such a case. Specifically, it shows that the pretreatment liquid was not applied and dried in Comparative Example 1, and the pretreatment liquid was not dried in Comparative Example 2.

TABLE 2

TABLE II

| EXAMPLE OR | PRETREATMENT LIQUID APPLYING AND DRYING | | | TRANSFERRING | EVALUATION | |
|---|---|---|---|---|---|---|
| COMPARATIVE EXAMPLE | PRETREATMENT LIQUID No. | CLOTH | DRYING METHOD | CONVEYANCE METHOD | DYEING DENSITY | UNEVENNESS DYEING |
| EXAMPLE 1 | 1 | COTTON BROAD | NON-CONTACT TYPE | CONTINUOUS TYPE | 3 | 3 |
| EXAMPLE 2 | 2 | COTTON BROAD | NON-CONTACT TYPE | CONTINUOUS TYPE | 3 | 4 |
| EXAMPLE 3 | 3 | COTTON BROAD | NON-CONTACT TYPE | CONTINUOUS TYPE | 4 | 4 |
| EXAMPLE 4 | 4 | COTTON BROAD | NON-CONTACT TYPE | CONTINUOUS TYPE | 4 | 5 |
| EXAMPLE 5 | 5 | COTTON BROAD | NON-CONTACT TYPE | CONTINUOUS TYPE | 4 | 5 |
| EXAMPLE 6 | 6 | COTTON BROAD | NON-CONTACT TYPE | CONTINUOUS TYPE | 5 | 5 |
| EXAMPLE 7 | 6 | RAYON | NON-CONTACT TYPE | CONTINUOUS TYPE | 5 | 5 |
| EXAMPLE 8 | 6 | T/C BROAD | NON-CONTACT TYPE | CONTINUOUS TYPE | 5 | 5 |
| EXAMPLE 9 | 6 | SILK SATIN | NON-CONTACT TYPE | CONTINUOUS TYPE | 4 | 5 |
| EXAMPLE 10 | 6 | NYLON TAFFETA | NON-CONTACT TYPE | CONTINUOUS TYPE | 4 | 4 |
| EXAMPLE 11 | 6 | POLYESTER DECYNE | NON-CONTACT TYPE | CONTINUOUS TYPE | 5 | 3 |
| EXAMPLE 12 | 6 | COTTON BROAD | NON-CONTACT TYPE | FLAT TYPE | 5 | 4 |
| EXAMPLE 13 | 7 | COTTON BROAD | NON-CONTACT TYPE | CONTINUOUS TYPE | 4 | 4 |
| EXAMPLE 14 | 8 | COTTON BROAD | NON-CONTACT TYPE | CONTINUOUS TYPE | 3 | 4 |

TABLE 2-continued

TABLE II

| EXAMPLE OR COMPARATIVE EXAMPLE | PRETREATMENT LIQUID APPLYING AND DRYING: PRETREATMENT LIQUID No. | CLOTH | DRYING METHOD | TRANSFERRING: CONVEYANCE METHOD | EVALUATION: DYEING DENSITY | UNEVENNESS DYEING |
|---|---|---|---|---|---|---|
| COMPARATIVE EXAMPLE 1 | — | COTTON BROAD | — | CONTINUOUS TYPE | 1 | 3 |
| COMPARATIVE EXAMPLE 2 | 6 | COTTON BROAD | — | FLAT TYPE | 5 | 1 |
| COMPARATIVE EXAMPLE 3 | 6 | COTTON BROAD | CONTACT TYPE | FLAT TYPE | 4 | 2 |

It is understood from Examples 1 to 14 and Comparative Examples 1 to 3 that by using the image forming method of the present invention, that is, by applying a pretreatment liquid to a cloth, drying the cloth in a non-contact manner, and then forming an image by a sublimation transfer method, the dyeing density is improved, and the dyeing unevenness is reduced.

It can be seen from Examples 1 to 5 that in a case where the content of the organic compound (dimethyl sulfoxide) is in the range of 35 to 100 mass %, particularly in the range of 50 to 100 mass % with respect to the total mass of the pretreatment liquid, the dyeing density is further improved, and the dyeing unevenness is further reduced.

From Examples 4 and 6, it is found that the dyeing density is further improved in a case where the pretreatment liquid contains the coloring material capturing compound.

ment liquid is dimethyl sulfoxide, the dyeing density is further improved, and the dyeing unevenness is further reduced.

Example [2]

1. Preparation of Pretreatment Liquid

A solvent (the organic solvent contained in the pretreatment liquid is referred to as "organic solvent α"), an aromatic heterocyclic compound, a surfactant and ion-exchanged water were mixed so as to have the composition shown in the following Table III, to prepare pretreatment liquids Nos. 1 to 3.

The compound used as the aromatic heterocyclic compound is the above-described exemplary compound (8).

In Table III, "N or S" represents nitrogen or sulfur, "○" represents that nitrogen or sulfur is contained, and "x" represents that nitrogen or sulfur is not contained.

TABLE 3

TABLE III

| PRETREATMENT LIQUID No. | SOLVENT (ORGANIC SOLVENT α): NAME | N OR S | BOILING POINT [° C.] | AMOUNT [MASS %] | ORGANIC SOLVENT AND WATER: AROMATIC HETEROCYCLIC COMPOUND: NAME | AMOUNT [MASS %] | SURFACTANT: NAME | AMOUNT [MASS %] | WATER [MASS %] |
|---|---|---|---|---|---|---|---|---|---|
| 1 | DMSO(* 1) | ○ | 189.0 | 80.0 | — | — | * 2 | 0.1 | 19.9 |
| 2 | 2-PYRROLIDONE | ○ | 251.0 | 80.0 | — | — | * 2 | 0.1 | 19.9 |
| 3 | DMSO(* 1) | ○ | 189.0 | 60.0 | EXEMPLARY COMPOUND (8) | 20.0 | * 2 | 0.1 | 19.9 |

* 1: DIMETHYL SULFOXIDE
* 2: SODIUM DODECYL SULFATE

From Examples 6 to 11, it is found that when the cloth contains natural fibers or cellulose, the dyeing density is further improved, and the dyeing unevenness is further reduced.

It is understood from Examples 6 and 12 that the uneven dyeing is further reduced by transferring onto a cloth by a continuous sublimation transfer press.

It is understood from Examples 6, 13 and 14 that when the I/O value of the organic compound contained in the pretreatment liquid is within a range of 1.00 to 3.00, the dyeing density is further improved. In particular, it is understood that when the organic compound contained in the pretreat-

2 Preparation of Sublimation Ink

[2.1] Dispersion Preparation

Disperbyk-190 (manufactured by BYK Japan KK, acid value 10 mgKOH/g) as a dispersant and ion-exchanged water were stirred and mixed until uniform. Thereafter, Disperse Red 60 was added as a sublimation dye, premixed, and dispersed until a Z-average particle size measured by a dynamic light scattering method was within a range of 150 to 200 nm. A dispersion liquid having a sublimation dye concentration of 20mass % was prepared.

At this time, the amounts of the dispersant, the ion-exchanged water, and the sublimation dye were adjusted so that the content of the sublimation dye became 20mass % with respect to the total mass of the dispersant and the amount of the solid content of the dispersant became 30% with respect to the total mass of the dispersible dye.

The measurement of the Z-average particle size by the dynamic light scattering method was carried out using a sand grinder filled with 50% by volume of 0. 5 mm zirconia beads, Zetasizer 1000 manufactured by Malvern ("Zetasizer" is a registered trademark of the company).

[2.2] Preparation of Sublimation Ink 30 mass % of the obtained dispersion liquid, 10 mass % of glycerin and 25 mass % of ethylene glycol as a solvent (the organic solvent contained in the sublimation ink is referred to as an "organic solvent β"), an appropriate amount of PROXEL GXL as a preservative, and an appropriate amount of Na citrate hydrate as a pH adjuster were added. Then, the resultant was mixed with ion-exchanged water so as to be 100mass % in total, and then filtered through a filter having a mesh of 1 μm to obtain an ink [1] (magenta sublimation ink).

3 Image Formation (Examples)

[3.1] Production of Image Formed Product [1]: Example 1

[3.1.1] Applying Pretreatment Liquid to Cloth (Pretreatment Liquid applying)

Cotton broadcloth 40 (cotton 100%) was used as the cloth.

Then, the pretreatment liquid No. 1 prepared above was applied to the cloth by the mangle method.

Specifically, the cloth was immersed in a bathtub filled with the pretreatment liquid No. 1 prepared as described above. Thereafter, the excess pretreatment liquid was squeezed with a mangle roll at a pickup rate (the amount of the treatment liquid applied with respect to the weight of the cloth) of 80%.

The temperature in the bath was set to 20 to 25° C.

The application amount of the organic solvent α immediately after the process of applying the pretreatment liquid was 15 mass % with respect to the mass of the entire cloth.

[3.1.2] Drying the Cloth

The cloth to which the pretreatment liquid No. 1 had been applied was put into the constant temperature dryer (non-contact dryer) used in Example [1] for a certain period of time. An excess of the pretreatment liquid was removed with warm air to prepare a pretreated cloth [1].

The drying conditions were a drying temperature of 200° C. and a drying time of 40 second, and the residual amount of the organic solvent α after drying was 3 mass %.

[3.1.3] Applying a Sublimation Ink to a Transfer Medium

Next, an inkjet printer having an inkjet head (Konica Minolta Head KM1024iMAE) was prepared as an image forming apparatus.

The ink [1] prepared as described above was discharged from the nozzle of the inkjet head to form a solid image on A4 sublimation transfer paper glue (manufactured by System Graphics) as transfer paper.

To be specific, in the main scanning 540 dpi×sub-scanning 720 dpi, an image (200 mm×200 mm as a whole) including a fine line grid, gradation, and a solid portion was formed. Dpi represents the number of ink droplets (dots) per inch, that is, per 2.54 cm. The ejection frequency was set to 22. 4 kHz. Thereafter, the transfer paper to which the ink was applied was dried with a dryer at 50 to 80° C. for 30 seconds.

At this time, the total residual amount of the organic solvent β (total residual amount of glycerin and ethylene glycol) contained in the sublimation ink (ink [1]) applied to the transfer paper was 5 mass %.

[3.1.4] Transferring the Sublimation Ink From the Transfer Medium to the Cloth (Sublimation Ink Transferring)

Next, the transfer paper to which the ink [1] had been applied was subjected to thermal compression bonding, using a transfer device (heat press), at a transfer temperature of 180° C., a transfer time of 180 seconds, and a press pressure of 300 g/cm$^2$, to the cloth to which the pretreatment liquid No. 1 had been applied. Thus, the ink [1] on the transfer paper was transferred onto the pretreated cloth [1] to obtain an image formed product [1].

The residual amount of the organic solvent α immediately before transferring the ink [1] on the transfer paper onto the pretreated cloth [1] was the residual amount of the organic solvent α after drying in the step of drying the cloth.

The residual amount of the organic solvent α was 3 mass % with respect to the total mass of the pretreated cloth [1].

[3.2] Preparation of Image Formed Products [2] to [12]: Examples 2 to 12

The type of cloth, the type of pretreatment liquid, and the application method in the pretreatment liquid applying, the application amount of the organic solvent α immediately after the step of applying the pretreatment liquid, the drying temperature and drying time in the drying, the residual amount of the organic solvent α after drying, and the transfer temperature and transfer time in the sublimation ink transferring were changed to conditions shown in Table IV below. Other than that, image formed products [2] to were prepared in the same manner as in the image formed product [1].

4 Evaluation

[4.1] The Dyeing Properties (Dyeing Density)

Evaluation Method

Using each of the image formed products [1] to [12], the portion to which the sublimation ink was transferred was measured with a spectrophotometer (manufactured by Konica Minolta, Inc), and the K/S value was calculated by the following formula. Dyeing property was evaluated according to the following evaluation criteria.

The evaluation results are as shown in Table IV.

In the following evaluation standards, A, B, C, and D were regarded as having no problem in practical use.

The K/S value is an index of the surface color density defined by the following expression, and a larger K/S value means a higher color density, and a smaller K/S value means a lower color density.

$$K/S=(1-R)^2/2S \qquad \text{Kubelka-Munk formula:}$$

(K: absorption coefficient of light, S: Scattering coefficient of light, R: Surface reflectance)

Evaluation Criterion

A K/S value is 15 or more.
B K/S value is 12 or more and less than 15.
C K/S value is 10 or more and less than 12.
D K/S value is 8 or more and less than 10.
E K/S value is less than 8.

[4.2] Degree of Yellowing Inhibition

Evaluation Method

Preliminarily, the L*value, a*value, and b*value in the L*a*b*color space of an untreated cloth were measured with a spectrocolorimeter (CM-25d, manufactured by Konica Minolta, Inc., measurement light source: D65).

In addition, using the image formed products [1] to [12], the L*value, the a*value, and the b*value in the L*a*b*color space of a white background portion to which the sublimation ink was not transferred (a portion to which only the pretreatment liquid was applied and to which the sublimation ink was not transferred) were measured.

In advance, the differences between the L*value, the a*value, and the b*value of the untreated cloth and the L*value, the a*value, and the b*value of the image formed products [1] to were set as the ΔL*value, the Δa*value, and the Δb*value. Then, the color difference ΔE*ab value was determined by the following formula, and the degree of suppression of yellowing was evaluated by the following evaluation criteria.

The evaluation results are as shown in Table IV.

In the following evaluation criteria, A, B, and C were considered as no problem in practical use.

$$\Delta E^*ab=\{(\Delta L^*)^2+(\Delta a^*)^2+(\Delta b^*)^2\}^{1/2} \quad \text{(Expression)}$$

Evaluation Criterion

A ΔE*ab value is less than 1.
B ΔE*ab value is 1 or more and less than 2.
C ΔE*ab value is equal to or greater than 2 and less than 3.
D ΔE*ab value is 3 or more and less than 4.
E ΔE*ab value is equal to or greater than 4 and less than 5.
F ΔE*ab value is 5 or more.

[4.3] The degree of discoloration in a high-humidity environment

Evaluation Method

Using each of the image formed products [1] to [12], an L*value, a*value, and b*value in the L*a*b*color space of the portion to which the sublimation ink was transferred were measured with a spectrocolorimeter (CM manufactured by Konica Minolta, Inc., measurement light source: D65). Thereafter, the image formed products [1] to [12] were allowed to stand in an environment of 20° C. and 95% RH for 7 days, and then an L*value, a*value, and b*value were measured again.

The differences between an L*value, a*value, and b*value before standing for 7 days and an L*value, a*value, and b*value after standing for 7 days were defined as ΔL*value, Δa*value, and Δb*value. A color difference ΔE*ab value before and after the leaving was obtained by the following expression, and the degree of discoloration in a high humidity environment was evaluated based on the following evaluation standards.

The evaluation results are as shown in Table IV.

In the following evaluation standards, A, B, C, and D were regarded as having no problem in practical use.

$$\Delta E^*ab=\{(\Delta L^*)^2+(\Delta a^*)^2+(\Delta b^*)^2\}^{1/2} \quad \text{(Expression)}$$

Evaluation Criterion

A ΔE*ab value is less than 1.
B ΔE*ab value is 1 or more and less than 2.
C ΔE*ab value is equal to or greater than 2 and less than 3.
D ΔE*ab value is 3 or more and less than 4.
E ΔE*ab value is equal to or greater than 4 and less than 5.
F ΔE*ab value is 5 or more.

TABLE 4

TABLE IV

| EXAMPLE | IMAGE FORMED PRODUCT No. | CLOTH TYPE | PRETREATMENT LIQUID APPLYING: PRETREATMENT LIQUID No | PRETREATMENT LIQUID APPLYING: APPLYING METHOD | PRETREATMENT LIQUID APPLYING: ORGANIC SOLVENT α APPLICATION AMOUNT (IMMEDIATELY AFTER) [MASS %] | DRYING: DRYING TIME [° C.] | DRYING: DRYING TIME [SECOND] | DRYING: ORGANIC SOLVENT α RESIDUAL AMOUNT (IMMEDIATELY BEFORE TRANSFER) [MASS %] |
|---|---|---|---|---|---|---|---|---|
| EXAMPLE 1 | [1] | COTTON BROAD 40 | 1 | MANGLE | 15 | 200 | 40 | 3 |
| EXAMPLE 2 | [2] | COTTON BROAD 40 | 1 | MANGLE | 80 | 200 | 30 | 20 |
| EXAMPLE 3 | [3] | COTTON BROAD 40 | 1 | MANGLE | 150 | 200 | 30 | 40 |
| EXAMPLE 4 | [4] | COTTON BROAD 40 | 2 | MANGLE | 15 | 200 | 40 | 3 |

TABLE 4-continued

TABLE IV

| | | | | | | | | |
|---|---|---|---|---|---|---|---|---|
| EXAMPLE 5 | [5] | COTTON BROAD 40 | 2 | MANGLE | 80 | 200 | 30 | 20 |
| EXAMPLE 6 | [6] | COTTON BROAD 40 | 2 | MANGLE | 150 | 200 | 30 | 40 |
| EXAMPLE 7 | [7] | COTTON BROAD 40 | 1 | MANGLE | 80 | 180 | 60 | 25 |
| EXAMPLE 8 | [8] | COTTON BROAD 40 | 1 | MANGLE | 80 | 130 | 60 | 30 |
| EXAMPLE 9 | [9] | COTTON BROAD 40 | 3 | MANGLE | 80 | 130 | 60 | 30 |
| EXAMPLE 10 | [10] | COTTON BROAD 40 | 3 | INKJET | 80 | 130 | 60 | 30 |
| EXAMPLE 11 | [11] | RAYON BROAD | 1 | MANGLE | 80 | 200 | 30 | 20 |
| EXAMPLE 12 | [12] | RAYON BROAD | 3 | INKJET | 80 | 130 | 60 | 30 |

| | SUBLIMATION INK TRANSFERRING | | | | |
|---|---|---|---|---|---|
| | TRANSFER | TRANSFER | EVALUATION | | |
| EXAMPLE | TEMPERATURE [° C.] | TIME [SECOND] | DYEING PROPERTY | WHITE BACKGROUND PORTION YELLOWING | HIGH-HUMIDITY DISCOLORATION |
| EXAMPLE 1 | 180 | 180 | D | C | D |
| EXAMPLE 2 | 180 | 180 | B | C | D |
| EXAMPLE 3 | 180 | 180 | A | C | D |
| EXAMPLE 4 | 180 | 180 | D | C | D |
| EXAMPLE 5 | 180 | 180 | B | C | D |
| EXAMPLE 6 | 180 | 180 | A | C | D |
| EXAMPLE 7 | 180 | 180 | B | C | D |
| EXAMPLE 8 | 180 | 180 | B | B | D |
| EXAMPLE 9 | 180 | 180 | A | B | C |
| EXAMPLE 10 | 180 | 180 | A | B | C |
| EXAMPLE 11 | 180 | 180 | B | C | D |
| EXAMPLE 12 | 180 | 180 | A | B | C |

5. Summary

As is clear from Table IV, the organic solvent contained in the pretreatment liquid is applied to cloth under specific conditions. Accordingly, it can be seen that the dyeing property, the degree of suppression of yellowing of the white background portion, and the degree of discoloration under a high-humidity environment are comprehensively excellent.

Although embodiments of the present invention have been described and illustrated in detail, the disclosed embodiments are made for purposes of illustration and example only and not limitation. The scope of the present invention should be interpreted by terms of the appended claims

The invention claimed is:

1. An image forming method for forming an image on a cloth with a sublimation coloring material, the image forming method comprising:

pretreatment liquid applying that is applying a pretreatment liquid to the cloth;

drying that is drying the cloth after the pretreatment liquid applying; and sublimation coloring material applying that is applying the sublimation coloring material to the cloth after the drying, wherein the pretreatment liquid contains an organic solvent, a heat source and the cloth are not in contact with each other in the drying, the sublimation coloring material applying includes transferring onto the cloth a transfer image formed by applying an ink containing the sublimation coloring material onto a transfer medium, an application amount of the organic solvent immediately after the pretreatment liquid applying is within a range of 10 to 150 mass % with respect to a mass of the entire cloth, and a residual amount of the organic solvent immediately before transfer of the ink containing the sublimation coloring material to the cloth in the transferring is in a range of 3 to 40 mass % with respect to the mass of the entire cloth.

2. The image forming method according to claim 1, wherein, in the drying, the cloth is dried by circulating warm air.

3. The image forming method according to claim 1, wherein, in the transferring, the transfer image formed on the transfer medium is transferred onto the cloth using a heating roller.

4. The image forming method according to claim 1, wherein the cloth includes natural fibers.

5. The image forming method according to claim 1, wherein the cloth contains cellulose.

6. The image forming method according to claim 1, wherein a content of the organic solvent is within a range of 35 to 100 mass % with respect to a total mass of the pretreatment liquid.

7. The image forming method according to claim 6, wherein the content of the organic solvent is within a range of 50 to 100 mass % with respect to the total mass of the pretreatment liquid.

8. The image forming method according to claim 1, wherein the organic solvent includes an organic solvent having an I/O value which is a ratio of an inorganic value to an organic value in a range of 1.00 to 3.00.

9. The image forming method according to claim 8, wherein the organic solvent includes dimethyl sulfoxide.

10. The image forming method according to claim 1, wherein the pretreatment liquid further contains a coloring material capturing compound.

11. The image forming method according to claim 1, wherein a temperature in the drying is lower than a boiling point of the organic solvent.

12. The image forming method according to claim 1, wherein a temperature at which the cloth is dried is lower than a heating temperature during the transferring of the transfer image.

13. The image forming method according to claim 12, wherein the pretreatment liquid further comprises an aromatic heterocyclic compound.

14. The image forming method according to claim 12, wherein the pretreatment liquid is applied by an inkjet method.

15. The image forming method according to claim 1, wherein the organic solvent contains nitrogen or sulfur.

* * * * *